(12) United States Patent
Li et al.

(10) Patent No.: US 11,851,614 B2
(45) Date of Patent: Dec. 26, 2023

(54) PROPPANT COATINGS AND METHODS OF MAKING

(71) Applicants: Saudi Arabian Oil Company, Dhahran (SA); Alfaisal University, Riyadh (SA)

(72) Inventors: Wengang Li, Dhahran (SA); Edreese Alsharaeh, Riyadh (SA); Mohan Raj Krishnan, Riyadh (SA)

(73) Assignees: Saudi Arabian Oil Company, Dhahran (SA); Alfaisal University, Riyadh (SA)

( * ) Notice: Subject to any disclaimer, the term of this patent is extended or adjusted under 35 U.S.C. 154(b) by 840 days.

(21) Appl. No.: 16/905,175

(22) Filed: Jun. 18, 2020

(65) Prior Publication Data

US 2021/0395603 A1 Dec. 23, 2021

(51) Int. Cl.

| C09K 8/80 | (2006.01) |
|---|---|
| C08F 12/08 | (2006.01) |
| C08F 20/06 | (2006.01) |
| C08G 59/50 | (2006.01) |
| C08K 3/04 | (2006.01) |
| C08K 5/03 | (2006.01) |

(52) U.S. Cl.
CPC ............ *C09K 8/805* (2013.01); *C08F 12/08* (2013.01); *C08F 20/06* (2013.01); *C08G 59/5006* (2013.01); *C08G 59/5033* (2013.01); *C08K 3/042* (2017.05); *C08K 5/03* (2013.01)

(58) Field of Classification Search
CPC .......... C09K 8/805; C08F 12/08; C08F 20/06; C08G 59/5006; C08G 59/5033; C08K 3/042; C08K 5/03
See application file for complete search history.

(56) References Cited

U.S. PATENT DOCUMENTS

| 5,597,784 | A | 1/1997 | Sinclair et al. |
| 6,528,157 | B1 | 3/2003 | Hussain et al. |
| 7,153,575 | B2 | 12/2006 | Anderson et al. |
| 7,867,613 | B2 | 1/2011 | Smith et al. |
| 8,298,667 | B2 | 10/2012 | Smith et al. |
| 8,557,916 | B1 | 10/2013 | Alsharaeh et al. |

(Continued)

FOREIGN PATENT DOCUMENTS

| CN | 105849359 B | 1/2020 |
| CN | 108165253 B | 3/2021 |

(Continued)

OTHER PUBLICATIONS

International Search Report and Written Opinion dated Sep. 8, 2021 pertaining to International application No. PCT/US2021/033636 filed May 21, 2021, 15 pages.

(Continued)

*Primary Examiner* — Crystal J. Lee
(74) *Attorney, Agent, or Firm* — DINSMORE & SHOHL LLP

(57) ABSTRACT

A coated proppant having a proppant particle, an intermediate cross-linked terpolymer layer encapsulating the proppant particle, and an outer resin layer encapsulating the intermediate cross-linked terpolymer layer. The proppant particle is selected from sand, ceramic, glass, and combinations thereof. The intermediate cross-linked terpolymer layer includes styrene, methyl methacrylate, and divinyl benzene. The outer resin layer includes a cured epoxy resin formed from an epoxy resin and a curing agent.

20 Claims, 6 Drawing Sheets

(56) References Cited

U.S. PATENT DOCUMENTS

| | | | |
|---|---|---|---|
| 9,403,115 B2 | 8/2016 | Majumder et al. | |
| 9,938,454 B2 | 4/2018 | Tanguay et al. | |
| 10,011,674 B2 | 7/2018 | Viswanath et al. | |
| 10,017,689 B2 | 7/2018 | Nguyen et al. | |
| 10,036,239 B2 | 7/2018 | Salla et al. | |
| 2008/0135245 A1 | 6/2008 | Smith et al. | |
| 2011/0278003 A1 | 11/2011 | Rediger | |
| 2012/0205101 A1 | 8/2012 | Pribytkov et al. | |
| 2015/0083420 A1* | 3/2015 | Gupta | E21B 43/006 166/280.1 |
| 2015/0119301 A1 | 4/2015 | Mcdaniel et al. | |
| 2016/0024376 A1* | 1/2016 | Fitzgerald | C09K 8/62 507/224 |
| 2016/0032179 A1 | 2/2016 | Tanguay et al. | |
| 2016/0230083 A1 | 8/2016 | Mohanty et al. | |
| 2017/0247608 A1 | 8/2017 | Raysoni et al. | |
| 2017/0327729 A1 | 11/2017 | Salla et al. | |
| 2018/0134949 A1 | 5/2018 | Monastiriotis et al. | |
| 2019/0002756 A1 | 1/2019 | Kincaid et al. | |
| 2021/0062076 A1 | 3/2021 | Li et al. | |

FOREIGN PATENT DOCUMENTS

| | | | |
|---|---|---|---|
| EP | 2092039 B1 | 7/2011 | |
| WO | 2011050046 A1 | 4/2011 | |
| WO | 2011146186 A2 | 11/2011 | |
| WO | 2013033391 A1 | 3/2013 | |
| WO | 2013192634 A2 | 12/2013 | |
| WO | WO-2013192634 A2 * | 12/2013 | C09K 8/62 |
| WO | 2015048021 A2 | 4/2015 | |
| WO | 2018031915 A1 | 2/2018 | |
| WO | 2021257243 A1 | 12/2021 | |
| WO | 2021257823 A1 | 12/2021 | |

OTHER PUBLICATIONS

U.S. Office Action dated Oct. 5, 2021 pertaining to U.S. Appl. No. 16/553,328, filed Aug. 28, 2019, 22 pages.
GCC First Office Action dated Jan. 31, 2021 which pertains to GCC Patent Application No. 2019-38861, filed Dec. 18, 2019, 3 pages.
International Search Report and Written Opinion dated Oct. 5, 2021 pertaining to International application No. PCT/US2021/037819 filed Jun. 17, 2021, 15 pages.
De Campos et al., "Hydraulic fracturing proppants", Ceramica, vol. 64, pp. 219-229, 2018.
International Search Report and Written Opinion dated Apr. 28, 2020 pertaining to International Application No. PCT/US2019/057168 filed Oct. 21, 2019, 11 pgs.
Gidley et al., "Effect of Proppant Failure and Fines Migration on Conductivity of Propped Fractures", SPE Production & Facilities, pp. 20-25, Feb. 1995.
Nguyen et al., "A New Approach for Enhancing Fracture Conductivity", Society of Petroleum Engineers, SPE 50002, 14 pgs., 1998.
Wang et al., "Reinforced performances of polymethyl methacrylate/silica fume composite spherical particles used as ultra-lightweight proppants", Journal of Reinforced Plastics & Composites, vol. 34(B), pp. 672-683, 2015.
Han et al., "Synthesis of Low-Density Heat-Resisting Polystyrene/Graphite Composite Microspheres Used as Water Carrying Fracturing Proppants", Polymer-Plastics Technology and Engineering, vol. 53, pp. 1647-1653, 2014.
Rickards et al., "High Strength, Ultralightweight Proppant Lends New Dimensions to Hydraulic Fracturing Applications", Society of Petroleum Engineers, SPE 84308, pp. 212-221, May 2006.
Zhang et al., "Ultra-lightweight composite proppants prepared via suspension polymerization", Journal of Composite Materials, vol. 0(0), pp. 1-9, 2015.
Liang et al., "A comprehensive review on proppant technologies", Petroleum, pp. 1-14, 2015.
Zoveidavianpoor et al., "Application of polymers for coating of proppant in hydraulic fracturing of subterraneous formations: A comprehensive review", Journal of Natural Gas Science and Engineering 24, pp. 197-209, 2015.
Hu et al., "Proppants Selection Based on Field Case Studies of Well Production Performance in the Bakken Shale Play", Society of Petroleum Engineers, SPE-169556-MS, 20 pgs., 2014.
Xu et al., "Study on Preparation and Properties of PMMA composite microspheres as the matrix of low density proppant", Applied Mechanics and Materials vols. 457-458, pp. 116-119, 2014.
Gianotti et al., "On the Thermal Stability of PS-b-PMMA Block and P(S-r-MMA) Random Copolymers for Nanopatterning Applications", Macromolecules, vol. 46, pp. 8224-8234, 2013.
Chuai et al., "Thermal Behavior and Properties of Polystyrene/Poly(methyl methacrylate) Blends", Journal of Applied Polymer Science, vol. 91, pp. 609-620, 2004.
Pangilinan et al., "Polymers for proppants used in hydraulic fracturing", Journal of Petroleum Science and Engineering, Manuscript, 23 pgs., Mar. 30, 2016.
Alsharaeh et al., "Evaluation of Nanomechanical Properties of (Styrene-Methyl Methacrylate) Copolymer Composites Containing Graphene Sheets", Industrial & Engineering Chemistry Research, vol. 52, pp. 17871-17881, 2013.
Fereidoon et al., "Nanomechanical and Nanoscratch Performance of Polystyrene/Poly(methyl methacrylate)/Multi-Walled Carbon Nanotubes Nanocomposite Coating", Polymer Composites, 7 pgs., 2017.
U.S. Notice of Allowance and Fee(s) Due dated Mar. 15, 2022 pertaining to U.S. Appl. No. 16/553,328, filed Aug. 28, 2019, 15 pages.
Notification of Transmittal of the International Search Report and the Written Opinion of the International Searching Authority, or the Declaration dated Oct. 25, 2022 pertaining to International application No. PCT/US2022/037240 filed Jul. 15, 2022, 16 pages.

\* cited by examiner

PROPPANT COATINGS AND METHODS OF MAKING

TECHNICAL FIELD

Embodiments of the present disclosure generally relate to proppant coatings, methods of making the proppant coatings and methods for using proppants having the proppant coating.

BACKGROUND

Hydraulic fracturing is a stimulation treatment routinely performed on oil and gas wells. Hydraulic fracturing fluids are pumped into the subsurface formation to be treated, causing fractures to open in the subsurface formation. Proppants, such as grains of sand of a particular size, may be mixed with the treatment fluid to keep the fracture open when the treatment is complete.

SUMMARY

It is often desirable during and after fracturing a subsurface formation to hold the fractures open through the use of proppants for more effective oil and gas production than without. However, conventional uncoated proppants break under downhole stress. Even coated proppants temperatures downhole exacerbate this effect.

Proppant coatings are used to protect the proppant particle from degradation by the presence of aqueous fluids at downhole temperatures. The proppant coating increases the surface area of the particle; therefore, the crush stress is distributed over a larger area of the coated proppant particle. The proppant coating also adheres to the proppant and prevents proppants that are crushed from releasing proppant fines, which may migrate into the formation and restrict flow conductivity of the formation. Conventional proppant coating techniques to reduce both the crush percentage and the generation of proppant fines are done at temperatures greater than 250° C. Conventional proppant coatings are designed to cure completely prior to the use of coated proppants in fracturing operations. However, even coated proppants can break down when stresses are increased, such as at pressures deep within a subsurface formation.

Accordingly, a need exists for proppant coatings, methods for making proppant coatings, and methods of using coated proppants downhole that can withstand increased stresses. Coated proppants often include a proppant coated with an intermediate polymer layer and an outer resin layer. However, these structures may not be strong enough to withstand pressures greater than 8000 pounds per square inch (psi).

According to a first aspect, a coated proppant comprises: a proppant particle; an intermediate cross-linked terpolymer layer encapsulating the proppant particle; and an outer resin layer encapsulating the intermediate cross-linked terpolymer layer.

A second aspect includes the coated proppant of the first aspect, wherein the proppant particle is selected from the group consisting of oxides, silicates, sand, ceramic, resin, epoxy, plastic, mineral, glass, and combinations thereof.

A third aspect includes the coated proppant of the first or second aspect, wherein the proppant particle is selected from the group consisting of sand, ceramic, glass, and combinations thereof.

A fourth aspect includes the coated proppant of any one of the first to third aspects, wherein the intermediate cross-linked terpolymer layer comprises a and a cross-linking agent.

A fifth aspect includes the coated proppant of the fourth aspect, wherein the combination of monomers comprises a first monomer and a second monomer that is different from the first monomer.

A sixth aspect includes the coated proppant of the fifth aspect, wherein the first monomer is cis- or trans-ethylene substituted aromatic organic compound and the second monomer is an alkyl acrylate.

A seventh aspect includes the coated proppant of the fifth or sixth aspects, wherein the first monomer is styrene.

An eighth aspect includes the coated proppant of any one of the fifth to seventh aspects, wherein the second monomer is methyl methacrylate.

A ninth aspect includes the coated proppant of any one of the fifth to eighth aspects, wherein the first monomer is styrene and the second monomer is methyl methacrylate.

A tenth aspect includes the coated proppant of any one of the fifth to ninth aspects, wherein the first monomer is present in the in an amount from 10.0 wt. % to 90.0 wt. %, and the second monomer is present in the in an amount from 10.0 wt. % to 90.0 wt. %.

An eleventh aspect includes the coated proppant of any one of the fifth to tenth aspects, wherein the first monomer is present in the in an amount from 40.0 wt. % to 60.0 wt. %, and the second monomer is present in the in an amount from 40.0 wt. % to 60.0 wt. %.

A twelfth aspect includes the coated proppant of any one of the fourth to eleventh aspects, wherein the cross-linking agent is selected from the group consisting of divinyl benzene, vinylpyridine, bis(vinylphenyl) ethane, bis(vinylbenzyloxy) hexane, and combinations thereof.

A thirteenth aspect includes the coated proppant of any one of the fourth to twelfth aspects, wherein the cross-linking agent comprises divinyl benzene.

A fourteenth aspect includes the coated proppant of any one of the fourth to thirteenth aspects, wherein the cross-linking agent is present as a super addition relative to the combination of monomers in an amount from 0.5 wt. % to 30.0 wt. %.

A fifteenth aspect includes the coated proppant of any one of the fourth to fourteenth aspects, wherein the cross-linking agent is present as a super addition relative to the combination of monomers in an amount from 1.0 wt. % to 15.0 wt. %.

A sixteenth aspect includes the coated proppant of any one of the first to fifteenth aspects, wherein the outer resin layer comprises a cured epoxy resin and graphene.

A seventeenth aspect includes the coated proppant of the sixteenth aspect, wherein the cured epoxy resin is formed from an epoxy resin and a curing agent.

An eighteenth aspect includes the coated proppant of the sixteenth or seventeenth aspects, wherein the epoxy resin has the following general formula:

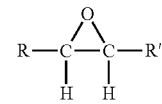

wherein R and R' are selected from the group consisting of a part of a six-membered ring, a polyhydroxyphenol, a polybasic acid, a polyol, and combinations thereof.

A nineteenth aspect includes the coated proppant of the seventeenth aspect, wherein the curing agent is selected from the group consisting of aliphatic polyamines and their derivatives, modified aliphatic amines, aromatic amines, and combinations thereof.

A twentieth aspect includes the coated proppant of any one of the first to nineteenth aspects, wherein the coated proppant produces fine production at a load of 12000 psi that is from 2.0% to 10.0%.

A twenty-first aspect includes the coated proppant of any one of the first to twentieth aspects, wherein the coated proppant produces fine production at a load of 10000 psi that is from 0.5% to 5.0%.

A twenty-second aspect includes the coated proppant of any one of the first to twenty-first aspects, wherein the coated proppant has an elastic modulus from 4.0 GPa to 7.0 GPa.

A twenty-third aspect includes the coated proppant of any one of the first to twenty-second aspects, wherein the coated proppant has a hardness from 0.10 GPa to 0.40 GPa.

A twenty-fourth aspect includes the coated proppant of any one of the first to twenty-third aspects, wherein the proppant particle is selected from the group consisting of sand, ceramic, glass, and combinations thereof; the intermediate cross-linked terpolymer layer comprises styrene, methyl methacrylate, and divinyl benzene; and the outer resin layer comprises a cured epoxy resin formed from an epoxy resin and a curing agent, wherein the epoxy resin has the following general formula:

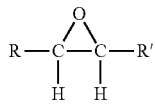

wherein R and R' are selected from the group consisting of a part of a six-membered ring, a polyhydroxyphenol, a polybasic acid, a polyol, and combinations thereof, and the curing agent is selected from the group consisting of aliphatic polyamines and their derivatives, modified aliphatic amines, aromatic amines, and combinations thereof.

A twenty-fifth aspect includes a method for producing a coated proppant comprising an intermediate cross-linked terpolymer layer, the method comprising: mixing a monomers solution comprising a first monomer, a second monomer that is different from the first monomer, a cross-linking agent, and an initiator; combining at least one proppant particle with the monomers solution; polymerizing the monomer solution on the surface of the at least one proppant particle to form at least one proppant particle having the intermediate cross-linked terpolymer layer on a surface of the at least one proppant particle; mixing a resin solution comprising an epoxy resin, a curing agent, and graphene; combining the at least one proppant particle having the intermediate cross-linked terpolymer layer on a surface of the at least one proppant particle and the resin solution; curing the resin solution to form the coated proppant comprising an intermediate cross-linked terpolymer layer.

A twenty-sixth aspect includes the method of the twenty-fifth aspect, wherein the proppant particle is selected from the group consisting of sand, ceramic, glass, and combinations thereof.

A twenty-seventh aspect includes the method of the twenty-fifth or twenty-sixth aspect, wherein the first monomer is cis- or trans-ethylene substituted aromatic organic compound and the second monomer is an alkyl acrylate.

A twenty-eighth aspect includes the method of any one of the twenty-fifth to twenty-seventh aspects, wherein the first monomer is styrene and the second monomer is methyl methacrylate.

A twenty-ninth aspect includes the method of any one of the twenty-fifth to twenty-eighth aspects, wherein the first monomer is present in the in an amount from 10.0 wt. % to 90.0 wt. %, and the second monomer is present in the combination of monomers in an amount from 10.0 wt. % to 90.0 wt. %.

A thirtieth aspect includes the method of any one of the twenty-fifth to twenty-ninth aspects, wherein the first monomer is present in the in an amount from 40.0 wt. % to 60.0 wt. %, and the second monomer is present in the combination of monomers in an amount from 40.0 wt. % to 60.0 wt. %.

A thirty-first aspect includes the method of any one of the twenty-fifth to thirtieth aspects, wherein the cross-linking agent is selected from the group consisting of divinyl benzene, vinylpyridine, bis(vinylphenyl) ethane, bis(vinylbenzyloxy) hexane, and combinations thereof.

A thirty-second aspect includes the method of any one of the twenty-fifth to thirty-first aspects, wherein the cross-linking agent comprises divinyl benzene.

A thirty-third aspect includes the method of any one of the twenty-fifth to thirty-second aspects, wherein the cross-linking agent is present as a super addition relative to the first monomer and the second monomer in an amount from 0.5 wt. % to 30.0 wt. %.

A thirty-fourth aspect includes the method of any one of the twenty-fifth to thirty-third aspects, wherein the cross-linking agent is present as a super addition relative to the first monomer and the second monomer in an amount from 1.0 wt. % to 15.0 wt. %.

A thirty-fifth aspect includes the method of any one of the twenty-fifth to thirty-fourth aspects, wherein the initiator is selected from the group consisting of azoisobutyronitrile (AIBN), benzoyl peroxide, tert-butyl peroxide, tert-butyl peracetate, tert-butyl peroxybenzoate, tert-butyl hydroperoxide, peracetic acid, potassium persulfate, and combinations thereof.

A thirty-sixth aspect includes the method of any one of the twenty-fifth to thirty-fifth aspects, wherein the initiator is present as a super addition relative to the first monomer and the second monomer in an amount from 1.0 wt. % to 10.0 wt. %.

A thirty-seventh aspect includes the method of any one of the twenty-fifth to thirty-sixth aspects, wherein the epoxy resin has the following general formula:

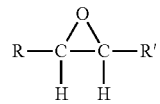

wherein R and R' are selected from the group consisting of a part of a six-membered ring, a polyhydroxyphenol, a polybasic acid, a polyol, and combinations thereof.

A thirty-eighth aspect includes the method of any one of the twenty-fifth to thirty-seventh aspects, wherein the curing agent is selected from the group consisting of aliphatic polyamines and their derivatives, modified aliphatic amines, aromatic amines, and combinations thereof.

A thirty-ninth aspect includes the method of any one of the twenty-fifth to thirty-eighth aspects, wherein the epoxy resin is present in a mixture of the epoxy resin and the curing agent in an amount from 15.0 wt. % to 90.0 wt. %.

A fortieth aspect includes the method of any one of the twenty-fifth to thirty-ninth aspects, wherein the epoxy resin is present in a mixture of the epoxy resin and the curing agent in an amount from 70.0 wt. % to 90.0 wt. %.

A forty-first aspect includes the method of any one of the twenty-fifth to fortieth aspects, wherein the curing agent is present in a mixture of the epoxy resin and the curing agent in an amount from 10.0 wt. % to 85.0 wt. %.

A forty-second aspect includes the method of any one of the twenty-fifth to forty-first aspects, wherein the curing agent is present in a mixture of the epoxy resin and the curing agent in an amount from 10.0 wt. % to 30.0 wt. %.

A forty-third aspect includes the method of any one of the twenty-fifth to forty-second aspects, wherein the graphene is present as a super addition relative to the epoxy resin and the curing agent in an amount from 0.05 wt. % to 0.50 wt. %.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

As used throughout this disclosure, the term "polymer backbone" or "copolymer backbone," which may also be called "the main chain," is the linearly-oriented polymeric chain to which all side chains or moieties are attached or grafted.

As used throughout this disclosure, the term "crosslinking" refers to the covalent bonding of a first polymeric chain with a second polymeric chain using a cross-linking agent.

As used throughout this disclosure, the term "hydraulic fracturing" refers to a stimulation treatment performed on reservoirs with a permeability of less than 10 milliDarcys. Hydraulic fracturing fluids are pumped into a subsurface formation such that fractures form. The wings of the fracture extend away from the wellbore in opposing directions according to the natural stresses within the subsurface formation. Proppants are mixed with the treatment fluid to keep the fracture open when the treatment is completed. Hydraulic fracturing creates fluid communication with a subsurface formation and bypasses damage that may exist in the near-wellbore area.

As used throughout this disclosure, the term "subsurface formation" refers to a body of rock that is sufficiently distinctive and continuous from the surrounding rock bodies that the body of rock can be mapped as a distinct entity. A subsurface formation is, therefore, sufficiently homogenous to form a single identifiable unit containing similar rheological properties throughout the subsurface formation, including, but not limited to, porosity and permeability. A subsurface formation is the fundamental unit of lithostratigraphy.

As used throughout this disclosure, the term "lithostatic pressure" refers to the pressure of the weight of overburden, or overlying rock, on a subsurface formation.

As used throughout this disclosure, the term "producing subsurface formation" refers to the subsurface formation from which hydrocarbons are produced.

As used throughout this disclosure, the term "proppants" refers to particles capable to hold fractures open after a hydraulic fracturing treatment is completed.

As used throughout this disclosure, the term "reservoir" refers to a subsurface formation having sufficient porosity and permeability to store and transmit fluids.

As used throughout this disclosure, the term "wellbore" refers to the drilled hole or borehole, including the open hole or uncased portion of the well. Borehole may refer to the void space defined by the wellbore wall, where the rock face that bounds the drilled hole defines the borehole.

Figure 1:
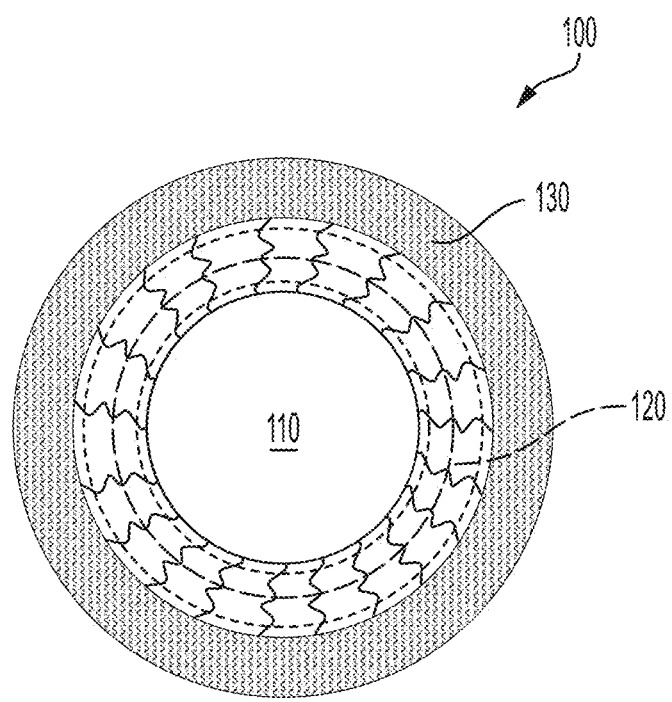
FIG. 1 is a schematic view of a proppant particle and a coated proppant according to one or more embodiments described in this disclosure.

The present disclosure is directed to compositions, methods of production, and methods of using a proppant comprising a cross-linked terpolymer intermediate coating and a resin outer layer. In embodiments, and with reference to FIG. 1, the coated proppant 100 comprises a proppant particle 110, an intermediate cross-linked terpolymer layer 120 encapsulating the proppant particle 110, and an outer resin layer 130 encapsulating the intermediate cross-linked terpolymer layer 120. In the embodiment shown in FIG. 1, the intermediate cross-linked terpolymer layer 120 directly encapsulates the proppant particle 110. As used herein "directly encapsulates" means that a layer is in direct, physical contact with the layer it encapsulates. Therefore, in the embodiment shown in FIG. 1, the intermediate cross-linked terpolymer layer 120 is in direct, physical contact with the proppant particle 110. Similarly, in the embodiment shown in FIG. 1, the outer resin layer 130 directly encapsulates the intermediate cross-linked terpolymer layer 120. In addition, in the embodiment shown in FIG. 1, the outer resin layer 130 indirectly encapsulates the proppant particle 110. As used herein, "indirectly encapsulates" means that a layer is not in direct, physical contact with the layer it is encapsulating, such as by the presence of an intermediate layer. As used herein, "encapsulates," "encapsulation," "encapsulating," and the like without "directly" or "indirectly" includes both direct and indirect encapsulation.

In embodiments, the proppant particle 110 is directly encapsulated by the intermediate cross-linked terpolymer layer 120, and the intermediate cross-linked terpolymer layer 120 is directly encapsulated by the outer resin layer 130. In embodiments, the proppant particle is directly encapsulated by the intermediate cross-linked terpolymer layer 120, and the intermediate cross-linked terpolymer layer 120 is indirectly encapsulated by the outer resin layer 130. In embodiments, the proppant particle is indirectly encapsulated by the intermediate cross-linked terpolymer layer 120, and the intermediate cross-linked terpolymer layer 120 is directly encapsulated by the outer resin layer 130. In embodiments, the proppant particle is indirectly encapsulated by the intermediate cross-linked terpolymer layer 120, and the intermediate cross-linked terpolymer layer 120 is indirectly encapsulated by the outer resin layer 130.

The proppant particle 110 may be chosen from any material suitable for use in hydraulic fracturing applications. As previously described, proppants are propping agent particles used in hydraulic fracturing fluids to maintain and hold open subsurface fractures during or following subsurface treatment. In some embodiments, the proppant particle 110 may comprise particles of materials such as oxides, silicates, sand, ceramic, resin, epoxy, plastic, mineral, glass, or combinations thereof. For instance, the proppant particle may comprise graded sand, treated sand, ceramic proppant, plastic proppant, or other materials. The proppant particle 110 may comprise particles of bauxite, sintered bauxite, Ti4+/polymer composites, where the superscript "4+" stands for the oxidation state of titanium, titanium nitride (TiN), or titanium carbide. The proppant particle may comprise glass particles or glass beads. Embodiments of the present disclosure may utilize at least one proppant particle 110 and in embodiments in which more than one proppant particle 110 is used, the proppant particles may contain a mixture of two or more different materials or three or more different materials.

The material of the proppant particle 110 may be chosen based on the particular application and characteristics desired, such as the depth of the subsurface formation in which the proppant particles will be used, as proppant particles 110 with greater mechanical strength are needed at greater lithostatic pressures. For instance, ceramic proppant materials exhibit greater strength, thermal resistance, and conductivity than sands. Additionally, ceramic proppant materials have more uniform size and shape than sands.

The proppant particle 110 may include various sizes or shapes. In some embodiments, the one or more proppant particles 110 may have sizes from 8 mesh to 200 mesh (diameters from 74 micrometers (μm) to 2.36 millimeters (mm)). In some embodiments, the proppant particles 110 may have sizes from 8 mesh to 16 mesh (diam. 2380 μm to 1180 μm), 16 mesh to 30 mesh (diam. 600 μm to 1180 μm), 20 mesh to 40 mesh (diam. 420 μm to 840 μm), 30 mesh to 50 mesh (diam. 300 μm to 600 μm), 40 mesh to 70 mesh (diam. 212 μm to 420 μm) or 70 mesh to 140 mesh (diam. 106 μm to 212 μm). The sphericity and roundness of the proppant particles may also vary based on the desired application.

In some embodiments, the proppant particles 110 may have a rough surface texture that may increase adhesion of the intermediate cross-linked terpolymer layer 120 coating to the proppant particle 110. The proppant particles 110 surfaces may be roughened to increase the surface area of the proppant particle 110 by any suitable physical or chemical method, including, for example, using an appropriate etchant. In some embodiments, the proppant particle 110 may have a surface that provides a desired adhesion of the intermediate cross-linked terpolymer layer 120 to the proppant particle 110 or may already be sufficiently rough without a need for chemical or physical roughening. Specifically, ball milling proppant particles 110 may provide relatively rounder particles as well as particles with increased surface roughness.

The term "rough" refers to a surface having at least one deviation from the normalized plane of the surface, such as a depression or protrusion. The surface may be uneven and irregular and may have one or more imperfections, such as dimples, stipples, bumps, or projections, or other surface defects. The rough surface may have an arithmetic average roughness (Ra) of greater than or equal to 1 nanometer (nm) (1 nm=0.001 μm). Ra is defined as the arithmetic average of the differences between the local surface heights and the average surface height and can be described by Equation 1, contemplating n measurements:

$$R_a = \frac{1}{n}\sum_{i=1}^{n}|y_i| \qquad \text{Equation 1}$$

In Equation 1, each $Y_i$ is the amount of deviation from the normalized plane of the surface (meaning the depth or height of a depression or protrusion, respectively) of the absolute value of the ith of n measurements. Thus, $R_a$ is the arithmetic average of the absolute values of n measurements of deviation y from the normalized plane of the surface. In some embodiments, the surface of the proppant particle 110 may have an $R_a$ of greater than or equal to 2 nm (0.002 μm), or greater than or equal to 10 nm (0.01 μm), or greater than or equal to 50 nm (0.05 μm), or greater than or equal to 100 nm (0.1 μm), or greater than or equal to 1 μm.

An intermediate cross-linked terpolymer layer 120 may, according to embodiments, be formed directly or indirectly on proppant particle 110. The following describes forming the intermediate cross-linked terpolymer layer 120 directly to the proppant particle 110 (thereby the intermediate cross-linked terpolymer layer 120 directly encapsulates the proppant particle 110). However, it should be understood that according to embodiments, the proppant particle 110 may be treated prior to forming the intermediate cross-linked terpolymer layer 120 so that the intermediate cross-linked terpolymer layer 120 indirectly encapsulates the proppant particle 110. According to embodiments, the intermediate cross-linked terpolymer layer 120 is formed to have a three dimensional (3D) cross-linked polymer structure. This may be accomplished by in situ bulk polymerization of a and a cross-linking agent. According to embodiments, an initiator is used to initiate the bulk polymerization of the monomers and cross-linking agent.

According to one or more embodiments, the intermediate cross-linked terpolymer layer 120 is formed on the proppant particle 110 by combining proppant particles 110 with the combination of monomers and the cross-linking agent. The initiator may be coated onto the proppant particle 110 before the proppant particle 110 is combined with the combination of monomers and the cross-linking agent; the initiator may be added to a mixture of the combination of monomers and the cross-linking agent; or the initiator may be coated onto the proppant particle 110 before the proppant particle 110 is combined with the and cross-linking agent and the initiator is also added to a mixture of the and the cross-linking agent.

In embodiments, the may include cis- or trans-ethylene substituted aromatic organic compound and an alkyl acrylate. According to embodiments, the cis- or trans-ethylene substituted aromatic organic compound is a styrene. In embodiments, the styrene may be selected from the group consisting of p-methyl styrene, p-floro styrene, p-chloro styrene and p-bromo styrene, and combinations thereof. According to embodiments, the alkyl acrylate is selected from the group consisting of methyl acrylate, ethyl acrylate, methyl methacrylate, ethyl methacrylate, methacrylic acid, butyl methacrylate, hydroxyethyl methacrylate, and combinations thereof. In one or more embodiments, the comprises styrene and methyl methacrylate. The cross-linking agent is, according to one or more embodiments, selected from the group consisting of divinyl benzene, vinylpyridine, bis(vinylphenyl) ethane, bis(vinylbenzyloxy) hexane, and combinations thereof. In one or more embodiments, the cross-linking agent is divinyl benzene. Although it should be understood that any of the above monomers and cross-linking agents may be used in any combination, according to embodiments, the proppant particles 110 are mixed with styrene and methyl methacrylate—as the combination of monomers—and divinyl benzene—as the cross-linking agent.

In one or more embodiments, the monomers may be mixed together to form the combination of monomers before adding the cross-linking agent. In embodiments, the combination of monomers comprises a first monomer and a second monomer. The first monomer is present in the in an amount from 10.0 wt. % to 90.0 wt. %, such as from 20.0 wt. % to 90.0 wt. %, from 30.0 wt. % to 90.0 wt. %, from 40.0 wt. % to 90.0 wt. %, from 50.0 wt. % to 90.0 wt. %, from 60.0 wt. % to 90.0 wt. %, from 70.0 wt. % to 90.0 wt. %, or from 80.0 wt. % to 90.0 wt. %, from 10.0 wt. % to 80.0 wt. %, from 20.0 wt. % to 80.0 wt. %, from 30.0 wt. % to 80.0 wt. %, from 40.0 wt. % to 80.0 wt. %, from 50.0 wt. % to 80.0 wt. %, from 60.0 wt. % to 80.0 wt. %, from 70.0 wt. % to 80.0 wt. %, from 10.0 wt. % to 70.0 wt. %, from 20.0 wt. % to 70.0 wt. %, from 30.0 wt. % to 70.0 wt. %, from 40.0 wt. % to 70.0 wt. %, from 50.0 wt. % to 70.0 wt. %, from 60.0 wt. % to 70.0 wt. %, from 10.0 wt. % to 60.0 wt. %, such as from 20.0 wt. % to 60.0 wt. %, from 30.0 wt. % to 60.0 wt. %, from 40.0 wt. % to 60.0 wt. %, from 50.0 wt. % to 60.0 wt. %, from 10.0 wt. % to 50.0 wt. %, such as from 20.0 wt. % to 50.0 wt. %, from 30.0 wt. % to 50.0 wt. %, from 40.0 wt. % to 50.0 wt. %, from 10.0 wt. % to 40.0 wt. %, from 20.0 wt. % to 40.0 wt. %, from 30.0 wt. % to 40.0 wt. %, from 10.0 wt. % to 30.0 wt. %, from 20.0 wt. % to 30.0 wt. %, from 10.0 wt. % to 20.0 wt. %. The second monomer is present in the in an amount from 10.0 wt. % to 90.0 wt. %, such as from 20.0 wt. % to 90.0 wt. %, from 30.0 wt. % to 90.0 wt. %, from 40.0 wt. % to 90.0 wt. %, from 50.0 wt. % to 90.0 wt. %, from 60.0 wt. % to 90.0 wt. %, from 70.0 wt. % to 90.0 wt. %, or from 80.0 wt. % to 90.0 wt. %, from 10.0 wt. % to 80.0 wt. %, from 20.0 wt. % to 80.0 wt. %, from 30.0 wt. % to 80.0 wt. %, from 40.0 wt. % to 80.0 wt. %, from 50.0 wt. % to 80.0 wt. %, from 60.0 wt. % to 80.0 wt. %, from 70.0 wt. % to 80.0 wt. %, from 10.0 wt. % to 70.0 wt. %, from 20.0 wt. % to 70.0 wt. %, from 30.0 wt. % to 70.0 wt. %, from 40.0 wt. % to 70.0 wt. %, from 50.0 wt. % to 70.0 wt. %, from 60.0 wt. % to 70.0 wt. %, from 10.0 wt. % to 60.0 wt. %, such as from 20.0 wt. % to 60.0 wt. %, from 30.0 wt. % to 60.0 wt. %, from 40.0 wt. % to 60.0 wt. %, from 50.0 wt. % to 60.0 wt. %, from 10.0 wt. % to 50.0 wt. %, such as from 20.0 wt. % to 50.0 wt. %, from 30.0 wt. % to 50.0 wt. %, from 40.0 wt. % to 50.0 wt. %, from 10.0 wt. % to 40.0 wt. %, from 20.0 wt. % to 40.0 wt. %, from 30.0 wt. % to 40.0 wt. %, from 10.0 wt. % to 30.0 wt. %, from 20.0 wt. % to 30.0 wt. %, from 10.0 wt. % to 20.0 wt. %. According to one or more embodiments, the first monomer is styrene and the second monomer is methyl methacrylate. It should be understood that the monomers may be mixed into the by any suitable, physical mixing process, such as stirring, blending, agitating, sonicating, and the like.

In embodiments, subsequent to mixing the combination of monomer, a cross-linking agent is added to the. The cross-linking agent is, according to embodiments, added to the in amounts from 0.5 wt. % to 30.0 wt. %, such as 1.0 wt. % to 30.0 wt. %, from 2.5 wt. % to 30.0 wt. %, from 5.0 wt. % to 30.0 wt. %, from 7.5 wt. % to 30.0 wt. %, from 10.0 wt. % to 30.0 wt. %, from 12.5 wt. % to 30.0 wt. %, from 15.0 wt. % to 30.0 wt. %, from 17.5 wt. % to 30.0 wt. %, from 20.0 wt. % to 30.0 wt. %, from 22.5 wt. % to 30.0 wt. %, from 25.0 wt. % to 30.0 wt. %, from 27.5 wt. % to 30.0 wt. %, from 0.5 wt. % to 27.5 wt. %, 1.0 wt. % to 27.5 wt. %, from 2.5 wt. % to 27.5 wt. %, from 5.0 wt. % to 27.5 wt. %, from 7.5 wt. % to 27.5 wt. %, from 10.0 wt. % to 27.5 wt. %, from 12.5 wt. % to 27.5 wt. %, from 15.0 wt. % to 27.5 wt. %, from 17.5 wt. % to 27.5 wt. %, from 20.0 wt. % to 27.5 wt. %, from 22.5 wt. % to 27.5 wt. %, from 25.0 wt. % to 27.5 wt. %, from 0.5 wt. % to 25.0 wt. %, 1.0 wt. % to 25.0 wt. %, from 2.5 wt. % to 25.0 wt. %, from 5.0 wt. % to 25.0 wt. %, from 7.5 wt. % to 25.0 wt. %, from 10.0 wt. % to 25.0 wt. %, from 12.5 wt. % to 25.0 wt. %, from 15.0 wt. % to 25.0 wt. %, from 17.5 wt. % to 25.0 wt. %, from 20.0 wt. % to 25.0 wt. %, from 22.5 wt. % to 25.0 wt. %, from 0.5 wt. % to 22.5 wt. %, 1.0 wt. % to 22.5 wt. %, from 2.5 wt. % to 22.5 wt. %, from 5.0 wt. % to 22.5 wt. %, from 7.5 wt. % to 22.5 wt. %, from 10.0 wt. % to 22.5 wt. %, from 12.5 wt. % to 22.5 wt. %, from 15.0 wt. % to 22.5 wt. %, from 17.5 wt. % to 22.5 wt. %, from 20.0 wt. % to 22.5 wt. %, from 0.5 wt. % to 20.0 wt. %, 1.0 wt. % to 20.0 wt. %, from 2.5 wt. % to 20.0 wt. %, from 5.0 wt. % to 20.0 wt. %, from 7.5 wt. % to 20.0 wt. %, from 10.0 wt. % to 20.0 wt. %, from 12.5 wt. % to 20.0 wt. %, from 15.0 wt. % to 20.0 wt. %, from 17.5 wt. % to 20.0 wt. %, from 0.5 wt. % to 17.5 wt. %, 1.0 wt. % to 17.5 wt. %, from 2.5 wt. % to 17.5 wt. %, from 5.0 wt. % to 17.5 wt. %, from 7.5 wt. % to 17.5 wt. %, from 10.0 wt. % to 17.5 wt. %, from 12.5 wt. % to 17.5 wt. %, from 15.0 wt. % to 17.5 wt. %, from 0.5 wt. % to 15.0 wt. %, 1.0 wt. % to 15.0 wt. %, from 2.5 wt. % to 15.0 wt. %, from 5.0 wt. % to 15.0 wt. %, from 7.5 wt. % to 15.0 wt. %, from 10.0 wt. % to 15.0 wt. %, from 12.5 wt. % to 15.0 wt. %, from 0.5 wt. % to 12.5 wt. %, 1.0 wt. % to 12.5 wt. %, from 2.5 wt. % to 12.5 wt. %, from 5.0 wt. % to 12.5 wt. %, from 7.5 wt. % to 12.5 wt. %, from 10.0 wt. % to 12.5 wt. %, from 0.5 wt. % to 10.0 wt. %, 1.0 wt. % to 10.0 wt. %, from 2.5 wt. % to 10.0 wt. %, from 5.0 wt. % to 10.0 wt. %, from 7.5 wt. % to 10.0 wt. %, from 0.5 wt. % to 7.5 wt. %, 1.0 wt. % to 7.5 wt. %, from 2.5 wt. % to 7.5 wt. %, from 5.0 wt. % to 7.5 wt. %, from 0.5 wt. % to 5.0 wt. %, 1.0 wt. % to 5.0 wt. %, from 2.5 wt. % to 5.0 wt. %, from 0.5 wt. % to 2.5 wt. %, 1.0 wt. % to 2.5 wt. %, or from 0.5 wt. % to 1.0 wt. %. The cross-linking agent is added as a percentage of the combination of the monomers and the cross-linking agent (e.g., if the weights 90 kg and 10 wt. % cross-linking agent is added, 10 kg of cross-linking agent would be added to the 90 kg of the combination of monomers). In embodiments, the cross-linking agent is divinyl benzene. Without being bound by any particular theory, if too little cross-linking agent is added, the cross-linked terpolymer will likely not be properly formed, but if more than 30.0 wt. % of the cross-linking agent is added, the intermediate cross-linked terpolymer layer 120 will be composed of linear polymer chains and the desired 3D structure will not be obtained. Accordingly, it is believed that the desired 3D cross-linked polymer structure for the intermediate cross-linked terpolymer layer 120 is achieved when the cross-linking agent is added to the in amounts from 0.5 wt. % to 30.0 wt. %.

As previously disclosed, an initiator may also be used to aid the polymerization process. Initiators that may be used in embodiments are selected from the group consisting of azoisobutyronitrile (AIBN), benzoyl peroxide, tert-butyl peroxide, tert-butyl peracetate, tert-butyl peroxybenzoate, tert-butyl hydroperoxide, peracetic acid, potassium persulfate, and combinations thereof. In embodiments, the initiator is AIBN. In embodiments, the initiator is coated onto the proppant particle 110 before the proppant particle 110 is combined with either the combination of monomers or the cross-linking agent. In some embodiments, the initiator is added to the mixture of the combined monomers and cross-linking agent. In some embodiments, the initiator is coated onto the proppant particle before the proppant particle 110 is combined with either the combination of monomers or the cross-linking agent, and the initiator is also added to the mixture of the combined monomers, and cross-linking agent.

According to one or more embodiments, the proppant particle 110 may be coated with the initiator by mixing the initiator with a solvent and coating the proppant particle 110 with the mixture of the initiator and the solvent. In embodiments, the solvent may be selected from the group consisting of acetone, methanol, ethanol, n-propanol, isopropanol, n-butanol, and combinations thereof. The initiator is, according to embodiments, present in the mixture of the initiator and the solvent in amounts from 1.0 wt. % to 10.0 wt. %, such as from 2.0 wt. % to 10.0 wt. %, from 3.0 wt. % to 10.0 wt. %, from 4.0 wt. % to 10.0 wt. %, from 5.0 wt. % to 10.0 wt. %, from 6.0 wt. % to 10.0 wt. %, from 7.0 wt. % to 10.0 wt. %, from 8.0 wt. % to 10.0 wt. %, from 9.0 wt. % to 10.0 wt. %, from 1.0 wt. % to 9.0 wt. %, from 2.0 wt. % to 9.0 wt. %, from 3.0 wt. % to 9.0 wt. %, from 4.0 wt. % to 9.0 wt. %, from 5.0 wt. % to 9.0 wt. %, from 6.0 wt. % to 9.0 wt. %, from 7.0 wt. % to 9.0 wt. %, from 8.0 wt. % to 9.0 wt. %, from 1.0 wt. % to 8.0 wt. %, from 2.0 wt. % to 8.0 wt. %, from 3.0 wt. % to 8.0 wt. %, from 4.0 wt. % to 8.0 wt. %, from 5.0 wt. % to 8.0 wt. %, from 6.0 wt. % to 8.0 wt. %, from 7.0 wt. % to 8.0 wt. %, from 1.0 wt. % to 7.0 wt. %, from 2.0 wt. % to 7.0 wt. %, from 3.0 wt. % to 7.0 wt. %, from 4.0 wt. % to 7.0 wt. %, from 5.0 wt. % to 7.0 wt. %, from 6.0 wt. % to 7.0 wt. %, from 1.0 wt. % to 6.0 wt. %, from 2.0 wt. % to 6.0 wt. %, from 3.0 wt. % to 6.0 wt. %, from 4.0 wt. % to 6.0 wt. %, from 5.0 wt. % to 6.0 wt. %, from 1.0 wt. % to 5.0 wt. %, from 2.0 wt. % to 5.0 wt. %, from 3.0 wt. % to 5.0 wt. %, from 4.0 wt. % to 5.0 wt. %, from 1.0 wt. % to 4.0 wt. %, from 2.0 wt. % to 4.0 wt. %, from 3.0 wt. % to 4.0 wt. %, from 1.0 wt. % to 3.0 wt. %, from 2.0 wt. % to 3.0 wt. %, or from 1.0 wt. % to 2.0 wt. %. It should be understood that the solvent and the initiator may be mixed by any suitable process, such as stirring, blending, agitating, sonicating, and the like. The mixture of solvent and initiator may, according to embodiments, be applied to the proppant particle 110 by any suitable process, such as by spraying the mixture of solvent and initiator onto the proppant particle 110, dipping the proppant particle 110 into the mixture of solvent and initiator, and the like. Applying the initiator to the surface of the proppant particle 110 before the proppant particle 110 is combined to the mixture of the and cross-linking agent is added helps polymerization of the and the cross-linking agent at the surface of the proppant particle 110.

According to embodiments, the initiator may be added as a crystallized or recrystallized initiator to the mixture that comprises the and the cross-linking agent. In such embodiments, the initiator is added as a super addition in relationship to the weight of the combination of monomers and the cross-linking agent (e.g., if the weight of the combination of monomers and the cross-linking agent is 100 kg, a 2 wt. % super addition of the initiator is 2 kg). The initiator may, according to embodiments, be added to the mixture that comprises the combination of monomers and the cross-linking agent in an amount from 1.0 wt. % to 10.0 wt. %, such as from 2.0 wt. % to 10.0 wt. %, from 3.0 wt. % to 10.0 wt. %, from 4.0 wt. % to 10.0 wt. %, from 5.0 wt. % to 10.0 wt. %, from 6.0 wt. % to 10.0 wt. %, from 7.0 wt. % to 10.0 wt. %, from 8.0 wt. % to 10.0 wt. %, from 9.0 wt. % to 10.0 wt. %, from 1.0 wt. % to 9.0 wt. %, from 2.0 wt. % to 9.0 wt. %, from 3.0 wt. % to 9.0 wt. %, from 4.0 wt. % to 9.0 wt. %, from 5.0 wt. % to 9.0 wt. %, from 6.0 wt. % to 9.0 wt. %, from 7.0 wt. % to 9.0 wt. %, from 8.0 wt. % to 9.0 wt. %, from 1.0 wt. % to 8.0 wt. %, from 2.0 wt. % to 8.0 wt. %, from 3.0 wt. % to 8.0 wt. %, from 4.0 wt. % to 8.0 wt. %, from 5.0 wt. % to 8.0 wt. %, from 6.0 wt. % to 8.0 wt. %, from 7.0 wt. % to 8.0 wt. %, from 1.0 wt. % to 7.0 wt. %, from 2.0 wt. % to 7.0 wt. %, from 3.0 wt. % to 7.0 wt. %, from 4.0 wt. % to 7.0 wt. %, from 5.0 wt. % to 7.0 wt. %, from 6.0 wt. % to 7.0 wt. %, from 1.0 wt. % to 6.0 wt. %, from 2.0 wt. % to 6.0 wt. %, from 3.0 wt. % to 6.0 wt. %, from 4.0 wt. % to 6.0 wt. %, from 5.0 wt. % to 6.0 wt. %, from 1.0 wt. % to 5.0 wt. %, from 2.0 wt. % to 5.0 wt. %, from 3.0 wt. % to 5.0 wt. %, from 4.0 wt. % to 5.0 wt. %, from 1.0 wt. % to 4.0 wt. %, from 2.0 wt. % to 4.0 wt. %, from 3.0 wt. % to 4.0 wt. %, from 1.0 wt. % to 3.0 wt. %, from 2.0 wt. % to 3.0 wt. %, or from 1.0 wt. % to 2.0 wt. %. It should be understood that the initiator, the and the cross-linking agent may be mixed by any suitable process, such as stirring, blending, agitating, sonicating, and the like.

The combination of the proppant particle 110, cross-linking agent, and initiator is well mixed and heated to a polymerization temperature to begin the polymerization process that will form the intermediate cross-linked terpolymer layer 120 on the proppant particle 110. In embodiments, the polymerization temperature is from 50° C. to 90° C., such as from 55° C. to 90° C., from 60° C. to 90° C., from 65° C. to 90° C., from 70° C. to 90° C., from 75° C. to 90° C., from 80° C. to 90° C., from 85° C. to 90° C., from 50° C. to 85° C., from 55° C. to 85° C., from 60° C. to 85° C., from 65° C. to 85° C., from 70° C. to 85° C., from 75° C. to 85° C., from 80° C. to 85° C., from 50° C. to 80° C., from 55° C. to 80° C., from 60° C. to 80° C., from 65° C. to 80° C., from 70° C. to 80° C., from 75° C. to 80° C., from 50° C. to 75° C., from 55° C. to 75° C., from 60° C. to 75° C., from 65° C. to 75° C., from 70° C. to 75° C., from 50° C. to 70° C., from 55° C. to 70° C., from 60° C. to 70° C., from 65° C. to 70° C., from 50° C. to 65° C., from 55° C. to 65° C., from 60° C. to 65° C., from 50° C. to 60° C., from 55° C. to 60° C., or from 50° C. to 55° C.

The combination of the proppant particle 110, cross-linking agent, and initiator may, according to embodiments, be held at the polymerization temperature for a duration that is from 12 hours to 60 hours, such as from 16 hours to 60 hours, from 20 hours to 60 hours, from 24 hours to 60 hours, from 28 hours to 60 hours, from 32 hours to 60 hours, from 36 hours to 60 hours, from 40 hours to 60 hours, from 44 hours to 60 hours, from 48 hours to 60 hours, from 52 hours to 60 hours, from 56 hours to 60 hours, from 12 hours to 56 hours, from 16 hours to 56 hours, from 20 hours to 56 hours, from 24 hours to 56 hours, from 28 hours to 56 hours, from 32 hours to 56 hours, from 36 hours to 56 hours, from 40 hours to 56 hours, from 44 hours to 56 hours, from 48 hours to 56 hours, from 52 hours to 56 hours, from 12 hours to 52 hours, from 16 hours to 52 hours, from 20 hours to 52 hours, from 24 hours to 52 hours, from 28 hours to 52 hours, from 32 hours to 52 hours, from 36 hours to 52 hours, from 40 hours to 52 hours, from 44 hours to 52 hours, from 48 hours to 52 hours, from 12 hours to 48 hours, from 16 hours to 48 hours, from 20 hours to 48 hours, from 24 hours to 48 hours, from 28 hours to 48 hours, from 32 hours to 48 hours, from 36 hours to 48 hours, from 40 hours to 48 hours, from 44 hours to 48 hours, from 12 hours to 44 hours, from 16 hours to 44 hours, from 20 hours to 44 hours, from 24 hours to 44 hours, from 28 hours to 44 hours, from 32 hours to 44 hours, from 36 hours to 44 hours, from 40 hours to 44 hours, from 12 hours to 40 hours, from 16 hours to 40 hours, from 20 hours to 40 hours, from 24 hours to 40 hours, from 28 hours to 40 hours, from 32 hours to 40 hours, from 36 hours to 40 hours, from 12 hours to 36 hours, from 16 hours to 36 hours, from 20 hours to 36 hours, from 24 hours to 36 hours, from 28 hours to 36 hours, from 32 hours to 36 hours, from 12 hours to 32 hours, from 16 hours to 32 hours, from 20 hours to 32 hours, from 24 hours to 32 hours, from 28 hours to 32 hours, from 12 hours to 28 hours, from 16 hours to 28 hours, from 20 hours to 28 hours, from 24 hours to 28 hours, from 12 hours to 24 hours, from 16 hours to 24 hours, from 20 hours to 24 hours, from 12 hours to 20 hours, from 16 hours to 20 hours, or from 12 hours to 16 hours.

It should be understood that, in embodiments, after the polymerization process has been completed, the initiator is not present in the final structure of the intermediate cross-linked terpolymer layer 120.

Without being bound by any particular theory, by forming an intermediate cross-linked terpolymer layer 120 as previously described, a polymer layer having a 3D structure is formed on the proppant particle 110. When a as previously described are combined with a cross-linking agent and an initiator, the initiator changes into radicals under the heating conditions. With the aid of initiator radicals, the monomer molecules are synchronously transformed into monomer and cross-linker free radicals. Thereafter, the monomer and cross-linker free radicals are turned into radical donors to the neighboring monomer molecules and the cross-linking agent. Consequently, a random addition copolymerization between the combination of monomers takes place to produce polymer chain radicals, resulting in the growth of co-polymer radicals. During the course of chain propagation, the growing chains may also randomly react with the cross-linker radicals. As a result, interpenetrating and 3D-cross-linked polymer network structures are eventually formed.

Figure 2:
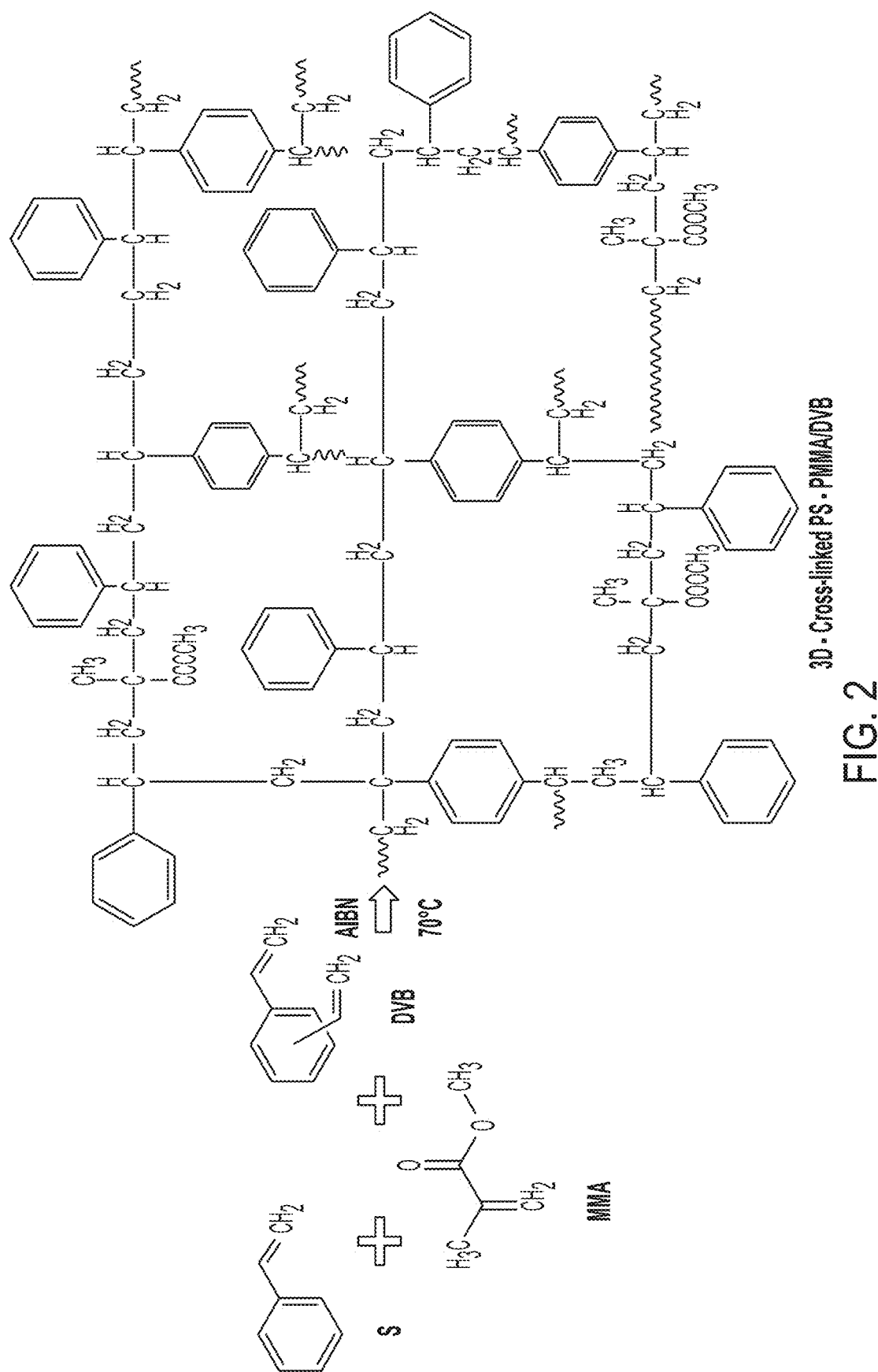
FIG. 2 is a schematic view of a cross-linking mechanism according to one or more embodiments described in this disclosure.

As a specific example, and according to embodiments where the combination of monomers is a combination of styrene and methyl methacrylate, the cross-linking agent is divinyl benzene, and the initiator is AIBN, the 3D-cross-linked PS-PMMA/DVB polymer layer having a 3D-cross-linked network structure for the PS-PMMA/DVB is depicted in FIG. 2.

The density of the 3D-network structure of the intermediate cross-linked terpolymer layer 120 is greatly influenced by the concentration of the cross-linking agent present in the preparation. When the cross-linking agent concentration is increased, the crosslinking densities of the resulting polymer are also increased, as is confirmed by thermal and mechanical analysis. For instance, the increased crosslinking densities resulting from greater amounts of cross-linking agent present during the preparation of the intermediate cross-linked terpolymer layer 120 may be confirmed by an increase in the degradation temperature (Tdeg) of the intermediate cross-linked terpolymer layer 120.

Subsequent to the formation of the intermediate cross-linked terpolymer layer 120 on the proppant particle 110, an outer resin layer 130 that directly or indirectly encapsulates the intermediate cross-linked terpolymer layer 120 is formed. The outer resin layer 130 is formed from a combination of epoxy resin, a curing agent, and graphene. Initially, the epoxy resin and curing agent are mixed together.

The epoxy resin that is used in the outer resin layer 130 according to embodiments has the following general formula:

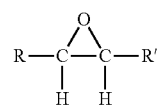

Formula (I)

Where R and R' are selected from the group consisting of a part of a six-membered ring, a polyhydroxyphenol, a polybasic acid, a polyol, and combinations thereof. In embodiments, the epoxy resin may be a bisphenol A epoxy resin having the following formula:

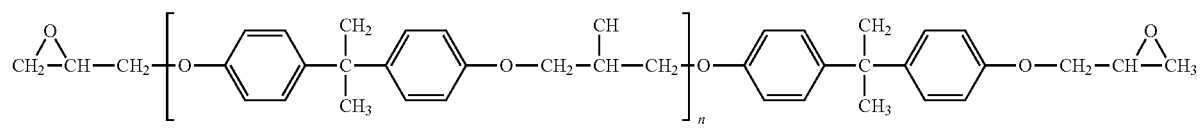

Formula (II)

The curing agent may be any amine functional curing agent. According to embodiments, the curing agent is selected from the group consisting of aliphatic polyamines and their derivatives, modified aliphatic amines, aromatic amines, and combinations thereof.

The amount of epoxy resin in the combination of epoxy resin and curing agent is, according to embodiments, from 15.0 wt. % to 90.0 wt. %, such as from 20.0 wt. % to 90.0 wt. %, from 25.0 wt. % to 90.0 wt. %, from 30.0 wt. % to 90.0 wt. %, from 35.0 wt. % to 90.0 wt. %, from 40.0 wt. % to 90.0 wt. %, from 45.0 wt. % to 90.0 wt. %, from 50.0 wt. % to 90.0 wt. %, from 55.0 wt. % to 90.0 wt. %, from 60.0 wt. % to 90.0 wt. %, from 65.0 wt. % to 90.0 wt. %, from 70.0 wt. % to 90.0 wt. %, from 75.0 wt. % to 90.0 wt. %, from 80.0 wt. % to 90.0 wt. %, from 85.0 wt. % to 90.0 wt. %, from 15.0 wt. % to 85.0 wt. %, from 20.0 wt. % to 85.0 wt. %, from 25.0 wt. % to 85.0 wt. %, from 30.0 wt. % to 85.0 wt. %, from 35.0 wt. % to 85.0 wt. %, from 40.0 wt. % to 85.0 wt. %, from 45.0 wt. % to 85.0 wt. %, from 50.0 wt. % to 85.0 wt. %, from 55.0 wt. % to 85.0 wt. %, from 60.0 wt. % to 85.0 wt. %, from 65.0 wt. % to 85.0 wt. %, from 70.0 wt. % to 85.0 wt. %, from 75.0 wt. % to 85.0 wt. %, from 80.0 wt. % to 85.0 wt. %, from 15.0 wt. % to 80.0 wt. %, from 20.0 wt. % to 80.0 wt. %, from 25.0 wt. % to 80.0 wt. %, from 30.0 wt. % to 80.0 wt. %, from 35.0 wt. % to 80.0 wt. %, from 40.0 wt. % to 80.0 wt. %, from 45.0 wt. % to 80.0 wt. %, from 50.0 wt. % to 80.0 wt. %, from 55.0 wt. % to 80.0 wt. %, from 60.0 wt. % to 80.0 wt. %, from 65.0 wt. % to 80.0 wt. %, from 70.0 wt. % to 80.0 wt. %, from 75.0 wt. % to 80.0 wt. %, from 15.0 wt. % to 75.0 wt. %, from 20.0 wt. % to 75.0 wt. %, from 25.0 wt. % to 75.0 wt. %, from 30.0 wt. % to 75.0 wt. %, from 35.0 wt. % to 75.0 wt. %, from 40.0 wt. % to 75.0 wt. %, from 45.0 wt. % to 75.0 wt. %, from 50.0 wt. % to 75.0 wt. %, from 55.0 wt. % to 75.0 wt. %, from 60.0 wt. % to 75.0 wt. %, from 65.0 wt. % to 75.0 wt. %, from 70.0 wt. % to 75.0 wt. %, from 15.0 wt. % to 70.0 wt. %, from 20.0 wt. % to 70.0 wt. %, from 25.0 wt. % to 70.0 wt. %, from 30.0 wt. % to 70.0 wt. %, from 35.0 wt. % to 70.0 wt. %, from 40.0 wt. % to 70.0 wt. %, from 45.0 wt. % to 70.0 wt. %, from 50.0 wt. % to 70.0 wt. %, from 55.0 wt. % to 70.0 wt. %, from 60.0 wt. % to 70.0 wt. %, from 65.0 wt. % to 70.0 wt. %, from 15.0 wt. % to 65.0 wt. %, from 20.0 wt. % to 65.0 wt. %, from 25.0 wt. % to 65.0 wt. %, from 30.0 wt. % to 65.0 wt. %, from 35.0 wt. % to 65.0 wt. %, from 40.0 wt. % to 65.0 wt. %, from 45.0 wt. % to 65.0 wt. %, from 50.0 wt. % to 65.0 wt. %, from 55.0 wt. % to 65.0 wt. %, from 60.0 wt. % to 65.0 wt. %, from 15.0 wt. % to 60.0 wt. %, from 20.0 wt. % to 60.0 wt. %, from 25.0 wt. % to 60.0 wt. %, from 30.0 wt. % to 60.0 wt. %, from 35.0 wt. % to 60.0 wt. %, from 40.0 wt. % to 60.0 wt. %, from 45.0 wt. % to 60.0 wt. %, from 50.0 wt. % to 60.0 wt. %, from 55.0 wt. % to 60.0 wt. %, from 15.0 wt. % to 55.0 wt. %, from 20.0 wt. % to 55.0 wt. %, from 25.0 wt. % to 55.0 wt. %, from 30.0 wt. % to 55.0 wt. %, from 35.0 wt. % to 55.0 wt. %, from 40.0 wt. % to 55.0 wt. %, from 45.0 wt. % to 55.0 wt. %, from 50.0 wt. % to 55.0 wt. %, from 15.0 wt. % to 50.0 wt. %, from 20.0 wt. % to 50.0 wt. %, from 25.0 wt. % to 50.0 wt. %, from 30.0 wt. % to 50.0 wt. %, from 35.0 wt. % to 50.0 wt. %, from 40.0 wt. % to 50.0 wt. %, from 45.0 wt. % to 50.0 wt. %, from 15.0 wt. % to 45.0 wt. %, from 20.0 wt. % to 45.0 wt. %, from 25.0 wt. % to 45.0 wt. %, from 30.0 wt. % to 45.0 wt. %, from 35.0 wt. % to 45.0 wt. %, from 40.0 wt. % to 45.0 wt. %, from 15.0 wt. % to 40.0 wt. %, from 20.0 wt. % to 40.0 wt. %, from 25.0 wt. % to 40.0 wt. %, from 30.0 wt. % to 40.0 wt. %, from 35.0 wt. % to 40.0 wt. %, from 15.0 wt. % to 35.0 wt. %, from 20.0 wt. % to 35.0 wt. %, from 25.0 wt. % to 35.0 wt. %, from 30.0 wt. % to 35.0 wt. %, from 15.0 wt. % to 30.0 wt. %, from 20.0 wt. % to 30.0 wt. %, from 25.0 wt. % to 30.0 wt. %, from 15.0 wt. % to 25.0 wt. %, from 20.0 wt. % to 25.0 wt. %, or from 15.0 wt. % to 20.0 wt. %.

According to embodiments, the curing agent may be present in the combination of epoxy resin and curing agent in amounts from 10.0 wt. % to 85.0 wt. %, such as from 15.0 wt. % to 85.0 wt. %, from 20.0 wt. % to 85.0 wt. %, from 25.0 wt. % to 85.0 wt. %, from 30.0 wt. % to 85.0 wt. %, from 35.0 wt. % to 85.0 wt. %, from 40.0 wt. % to 85.0 wt. %, from 45.0 wt. % to 85.0 wt. %, from 50.0 wt. % to 85.0 wt. %, from 55.0 wt. % to 85.0 wt. %, from 60.0 wt. % to 85.0 wt. %, from 65.0 wt. % to 85.0 wt. %, from 70.0 wt. % to 85.0 wt. %, from 75.0 wt. % to 85.0 wt. %, from 80.0 wt. % to 85.0 wt. %, from 10.0 wt. % to 80.0 wt. %, from 15.0 wt. % to 80.0 wt. %, from 20.0 wt. % to 80.0 wt. %, from 25.0 wt. % to 80.0 wt. %, from 30.0 wt. % to 80.0 wt. %, from 35.0 wt. % to 80.0 wt. %, from 40.0 wt. % to 80.0 wt. %, from 45.0 wt. % to 80.0 wt. %, from 50.0 wt. % to 80.0 wt. %, from 55.0 wt. % to 80.0 wt. %, from 60.0 wt. % to 80.0 wt. %, from 65.0 wt. % to 80.0 wt. %, from 70.0 wt. % to 80.0 wt. %, from 75.0 wt. % to 80.0 wt. %, from 10.0 wt. % to 75.0 wt. %, from 15.0 wt. % to 75.0 wt. %, from 20.0 wt. % to 75.0 wt. %, from 25.0 wt. % to 75.0 wt. %, from 30.0 wt. % to 75.0 wt. %, from 35.0 wt. % to 75.0 wt. %, from 40.0 wt. % to 75.0 wt. %, from 45.0 wt. % to 75.0 wt. %, from 50.0 wt. % to 75.0 wt. %, from 55.0 wt. % to 75.0 wt. %, from 60.0 wt. % to 75.0 wt. %, from 65.0 wt. % to 75.0 wt. %, from 70.0 wt. % to 75.0 wt. %, from 10.0 wt. % to 70.0 wt. %, from 15.0 wt. % to 70.0 wt. %, from 20.0 wt. % to 70.0 wt. %, from 25.0 wt. % to 70.0 wt. %, from 30.0 wt. % to 70.0 wt. %, from 35.0 wt. % to 70.0 wt. %, from 40.0 wt. % to 70.0 wt. %, from 45.0 wt. % to 70.0 wt. %, from 50.0 wt. % to 70.0 wt. %, from 55.0 wt. % to 70.0 wt. %, from 60.0 wt. % to 70.0 wt. %, from 65.0 wt. % to 70.0 wt. %, from 10.0 wt. % to 65.0 wt. %, from 15.0 wt. % to 65.0 wt. %, from 20.0 wt. % to 65.0 wt. %, from 25.0 wt. % to 65.0 wt. %, from 30.0 wt. % to 65.0 wt. %, from 35.0 wt. % to 65.0 wt. %, from 40.0 wt. % to 65.0 wt. %, from 45.0 wt. % to 65.0 wt. %, from 50.0 wt. % to 65.0 wt. %, from 55.0 wt. % to 65.0 wt. %, from 60.0 wt. % to 65.0 wt. %, from 10.0 wt. % to 60.0 wt. %, from 15.0 wt. % to 60.0 wt. %, from 20.0 wt. % to 60.0 wt. %, from 25.0 wt. % to 60.0 wt. %, from 30.0 wt. % to 60.0 wt. %, from 35.0 wt. % to 60.0 wt. %, from 40.0 wt. % to 60.0 wt. %, from 45.0 wt. % to 60.0 wt. %, from 50.0 wt. % to 60.0 wt. %, from 55.0 wt. % to 60.0 wt. %, from 10.0 wt. % to 55.0 wt. %, from 15.0 wt. % to 55.0 wt. %, from 20.0 wt. % to 55.0 wt. %, from 25.0 wt. % to 55.0 wt. %, from 30.0 wt. % to 55.0 wt. %, from 35.0 wt. % to 55.0 wt. %, from 40.0 wt. % to 55.0 wt. %, from 45.0 wt. % to 55.0 wt. %, from 50.0 wt. % to 55.0 wt. %, from 10.0 wt. % to 50.0 wt. %, from 15.0 wt. % to 50.0 wt. %, from 20.0 wt. % to 50.0 wt. %, from 25.0 wt. % to 50.0 wt. %, from 30.0 wt. % to 50.0 wt. %, from 35.0 wt. % to 50.0 wt. %, from 40.0 wt. % to 50.0 wt. %, from 45.0 wt. % to 50.0 wt. %, from 10.0 wt. % to 45.0 wt. %, from 15.0 wt. % to 45.0 wt. %, from 20.0 wt. % to 45.0 wt. %, from 25.0 wt. % to 45.0 wt. %, from 30.0 wt. % to 45.0 wt. %, from 35.0 wt. % to 45.0 wt. %, from 40.0 wt. % to 45.0 wt. %, from 10.0 wt. % to 40.0 wt. %, from 15.0 wt. % to 40.0 wt. %, from 20.0 wt. % to 40.0 wt. %, from 25.0 wt. % to 40.0 wt. %, from 30.0 wt. % to 40.0 wt. %, from 35.0 wt. % to 40.0 wt. %, from 10.0 wt. % to 35.0 wt. %, from 15.0 wt. % to 35.0 wt. %, from 20.0 wt. % to 35.0 wt. %, from 25.0 wt. % to 35.0 wt. %, from 30.0 wt. % to 35.0 wt. %, from 10.0 wt. % to 30.0 wt. %, from 15.0 wt. % to 30.0 wt. %, from 20.0 wt. % to 30.0 wt. %, from 25.0 wt. % to 30.0 wt. %, from 10.0 wt. % to 25.0 wt. %, from 15.0 wt. % to 25.0 wt. %, from 20.0 wt. % to 25.0 wt. %, from 10.0 wt. % to 20.0 wt. %, from 15.0 wt. % to 20.0 wt. %, or from 10.0 wt. % to 15.0 wt. %. It should be understood that the epoxy resin and curing agent may be mixed together by any suitable, physical mixing process, such as stirring, blending, agitating, sonicating, and the like.

Once the epoxy resin and curing agent are combined, graphene is added to the combination of epoxy resin and curing agent. According to embodiments, the graphene used in the outer resin layer 130 has a thickness from 6.0 nm to 8.0 nm, such as from 6.5 nm to 8.0 nm, from 7.0 nm to 8.0 nm, from 7.5 nm to 8.0 nm, from 6.5 nm to 7.5 nm, from 7.0 nm to 7.5 nm, or from 6.5 nm to 7.0 nm. According to embodiments, the graphene used in the outer resin layer 130 has a surface area from 120 m2/g to 150 m2/g, such as from 125 m2/g to 150 m2/g, from 130 m2/g to 150 m2/g, from 135 m2/g to 150 m2/g, from 140 m2/g to 150 m2/g, from 145 m2/g to 150 m2/g, from 120 m2/g to 145 m2/g, from 125 m2/g to 145 m2/g, from 130 m2/g to 145 m2/g, from 135 m2/g to 145 m2/g, from 140 m2/g to 145 m2/g, from 120 m2/g to 140 m2/g, from 125 m2/g to 140 m2/g, from 130 m2/g to 140 m2/g, from 135 m2/g to 140 m2/g, from 120 m2/g to 135 m2/g, from 125 m2/g to 135 m2/g, from 130 m2/g to 135 m2/g, from 120 m2/g to 130 m2/g, from 125 m2/g to 130 m2/g, or from 120 m2/g to 125 m2/g. According to embodiments, the graphene used in the outer resin layer 130 has an average particle size from 15 μm to 35 μm, such as from 20 μm to 35 μm, from 25 μm to 35 μm, from 30 μm to 35 μm, from 15 μm to 30 μm, from 20 μm to 30 μm, from 25 μm to 30 μm, from 15 μm to 25 μm, from 20 μm to 25 μm, or from 15 μm to 20 μm. According to embodiments, the graphene used in the outer resin layer 130 has a bulk density from 0.03 g/cc to 0.10 g/cc, such as from 0.05 g/cc to 0.10 g/cc, from 0.07 g/cc to 0.10 g/cc, from 0.03 g/cc to 0.07 g/cc, from 0.05 g/cc to 0.07 g/cc, or from 0.03 g/cc to 0.05 g/cc. According to embodiments, the graphene used in the outer resin layer 130 has a thermal conductivity from 2500 W/(m K) to 3500 W/(m K), such as from 2750 W/(m K) to 3500 W/(m K), from 3000 W/(m K) to 3500 W/(m K), from 3250 W/(m K) to 3500 W/(m K), from 2500 W/(m K) to 3250 W/(m K), from 2750 W/(m K) to 3250 W/(m K), from 3000 W/(m K) to 3250 W/(m K), from 2500 W/(m K) to 3000 W/(m K), from 2750 W/(m K) to 3000 W/(m K), or from 2500 W/(m K) to 2750 W/(m K). According to embodiments, the graphene used in the outer resin layer 130 has a tensile strength from 2.0 MPa to 7.0 MPa, such as from 2.5 MPa to 7.0 MPa, from 3.0 MPa to 7.0 MPa, from 3.5 MPa to 7.0 MPa, from 4.0 MPa to 7.0 MPa, from 4.5 MPa to 7.0 MPa, from 5.0 MPa to 7.0 MPa, from 5.5 MPa to 7.0 MPa, from 6.0 MPa to 7.0 MPa, from 6.5 MPa to 7.0 MPa, from 2.0 MPa to 6.5 MPa, from 2.5 MPa to 6.5 MPa, from 3.0 MPa to 6.5 MPa, from 3.5 MPa to 6.5 MPa, from 4.0 MPa to 6.5 MPa, from 4.5 MPa to 6.5 MPa, from 5.0 MPa to 6.5 MPa, from 5.5 MPa to 6.5 MPa, from 6.0 MPa to 6.5 MPa, from 2.0 MPa to 6.0 MPa, from 2.5 MPa to 6.0 MPa, from 3.0 MPa to 6.0 MPa, from 3.5 MPa to 6.0 MPa, from 4.0 MPa to 6.0 MPa, from 4.5 MPa to 6.0 MPa, from 5.0 MPa to 6.0 MPa, from 5.5 MPa to 6.0 MPa, from 2.0 MPa to 5.5 MPa, from 2.5 MPa to 5.5 MPa, from 3.0 MPa to 5.5 MPa, from 3.5 MPa to 5.5 MPa, from 4.0 MPa to 5.5 MPa, from 4.5 MPa to 5.5 MPa, from 5.0 MPa to 5.5 MPa, from 2.0 MPa to 5.0 MPa, from 2.5 MPa to 5.0 MPa, from 3.0 MPa to 5.0 MPa, from 3.5 MPa to 5.0 MPa, from 4.0 MPa to 5.0 MPa, from 4.5 MPa to 5.0 MPa, from 2.0 MPa to 4.5 MPa, from 2.5 MPa to 4.5 MPa, from 3.0 MPa to 4.5 MPa, from 3.5 MPa to 4.5 MPa, from 4.0 MPa to 4.5 MPa, from 2.0 MPa to 4.0 MPa, from 2.5 MPa to 4.0 MPa, from 3.0 MPa to 4.0 MPa, from 3.5 MPa to 4.0 MPa, from 2.0 MPa to 3.5 MPa, from 2.5 MPa to 3.5 MPa, from 3.0 MPa to 3.5 MPa, from 2.0 MPa to 3.0 MPa, from 2.5 MPa to 3.0 MPa, from 2.0 MPa to 2.5 MPa. According to embodiments, the graphene used in the outer resin layer 130 has an electrical conductivity from $0.50 \times 10^7$ S/m to $1.50 \times 10^7$ S/m, such as from $0.75 \times 10^7$ S/m to $1.50 \times 10^7$ S/m, from $1.00 \times 10^7$ S/m to $1.50 \times 10^7$ S/m, from $1.25 \times 10^7$ S/m to $1.50 \times 10^7$ S/m, from $0.50 \times 10^7$ S/m to $1.25 \times 10^7$ S/m, from $0.75 \times 10^7$ S/m to $1.25 \times 10^7$ S/m, from $1.00 \times 10^7$ S/m to $1.25 \times 10^7$ S/m, from $0.50 \times 10^7$ S/m to $1.00 \times 10^7$ S/m, from $0.75 \times 10^7$ S/m to $1.00 \times 10^7$ S/m, or from $0.50 \times 10^7$ S/m to $0.75 \times 10^7$ S/m. According to some embodiments, the graphene used in the outer resin layer 130 is XGNP-M-25 Graphene Nanoplatelets manufactured by XG Sciences.

According to one or more embodiments, the graphene is added to the combination of epoxy resin and curing agent as a super addition relative to the combination of epoxy resin and curing agent. In embodiments, the graphene may be added as a super addition in amounts from 0.05 wt. % to 0.50 wt. %, such as from 0.10 wt. % to 0.50 wt. %, from 0.15 wt. % to 0.50 wt. %, from 0.20 wt. % to 0.50 wt. %, from 0.25 wt. % to 0.50 wt. %, from 0.30 wt. % to 0.50 wt. %, from 0.35 wt. % to 0.50 wt. %, from 0.40 wt. % to 0.50 wt. %, from 0.45 wt. % to 0.50 wt. %, from 0.05 wt. % to 0.45 wt. %, from 0.10 wt. % to 0.45 wt. %, from 0.15 wt. % to 0.45 wt. %, from 0.20 wt. % to 0.45 wt. %, from 0.25 wt. % to 0.45 wt. %, from 0.30 wt. % to 0.45 wt. %, from 0.35 wt. % to 0.45 wt. %, from 0.40 wt. % to 0.45 wt. %, from 0.05 wt. % to 0.40 wt. %, from 0.10 wt. % to 0.40 wt. %, from 0.15 wt. % to 0.40 wt. %, from 0.20 wt. % to 0.40 wt. %, from 0.25 wt. % to 0.40 wt. %, from 0.30 wt. % to 0.40 wt. %, from 0.35 wt. % to 0.40 wt. %, from 0.05 wt. % to 0.35 wt. %, from 0.10 wt. % to 0.35 wt. %, from 0.15 wt. % to 0.35 wt. %, from 0.20 wt. % to 0.35 wt. %, from 0.25 wt. % to 0.35 wt. %, from 0.30 wt. % to 0.35 wt. %, from 0.05 wt. % to 0.30 wt. %, from 0.10 wt. % to 0.30 wt. %, from 0.15 wt. % to 0.30 wt. %, from 0.20 wt. % to 0.30 wt. %, from 0.25 wt. % to 0.30 wt. %, from 0.05 wt. % to 0.25 wt. %, from 0.10 wt. % to 0.25 wt. %, from 0.15 wt. % to 0.25 wt. %, from 0.20 wt. % to 0.25 wt. %, from 0.05 wt. % to 0.20 wt. %, from 0.10 wt. % to 0.20 wt. %, from 0.15 wt. % to 0.20 wt. %, from 0.05 wt. % to 0.15 wt. %, from 0.10 wt. % to 0.15 wt. %, or from 0.05 wt. % to 0.10 wt. %. It should be understood that the combination of epoxy resin and curing agent may be mixed with the graphene by any suitable, physical mixing process, such as stirring, blending, agitating, sonicating, and the like.

The combination of epoxy resin, curing agent, and graphene are added to proppant particles 110 encapsulated in an intermediate cross-linked terpolymer layer 120. It should be understood that the combination of epoxy resin, curing agent, and graphene may be mixed with the encapsulated proppant particles by any suitable, physical mixing process, such as stirring, blending, agitating, sonicating, and the like. Subsequent to mixing, the encapsulated proppant particles having the combination of epoxy resin, curing agent, and graphene on their outermost surface are heated to a curing temperature to cure the epoxy resin. According to embodiments, the curing temperature is from 100° C. to 200° C., such as from 110° C. to 200° C., from 120° C. to 200° C., from 130° C. to 200° C., from 140° C. to 200° C., from 150° C. to 200° C., from 160° C. to 200° C., from 170° C. to 200° C., from 180° C. to 200° C., from 190° C. to 200° C., from 100° C. to 190° C., from 110° C. to 190° C., from 120° C. to 190° C., from 130° C. to 190° C., from 140° C. to 190° C., from 150° C. to 190° C., from 160° C. to 190° C., from 170° C. to 190° C., from 180° C. to 190° C., from 100° C. to 180° C., from 110° C. to 180° C., from 120° C. to 180° C., from 130° C. to 180° C., from 140° C. to 180° C., from 150° C. to 180° C., from 160° C. to 180° C., from 170° C. to 180° C., from 100° C. to 170° C., from 110° C. to 170° C., from 120° C. to 170° C., from 130° C. to 170° C., from 140° C. to 170° C., from 150° C. to 170° C., from 160° C. to 170° C., from 100° C. to 160° C., from 110° C. to 160° C., from 120° C. to 160° C., from 130° C. to 160° C., from 140° C. to 160° C., from 150° C. to 160° C., from 100° C. to 150° C., from 110° C. to 150° C., from 120° C. to 150° C., from 130° C. to 150° C., from 140° C. to 150° C., from 100° C. to 140° C., from 110° C. to 140° C., from 120° C. to 140° C., from 130° C. to 140° C., from 100° C. to 130° C., from 110° C. to 130° C., from 120° C. to 130° C., from 100° C. to 120° C., from 110° C. to 120° C., or from 100° C. to 110° C.

According to embodiments, the encapsulated proppant particles having the combination of epoxy resin, curing agent, and graphene on their outermost surface may be held at the curing temperature for a time from 1 minute to 20 minutes, such as from 2 minutes to 20 minutes, from 5 minutes to 20 minutes, from 7 minutes to 20 minutes, from 10 minutes to 20 minutes, from 12 minutes to 20 minutes, from 15 minutes to 20 minutes, from 17 minutes to 20 minutes, from 1 minute to 17 minutes, from 2 minutes to 17 minutes, from 5 minutes to 17 minutes, from 7 minutes to 17 minutes, from 10 minutes to 17 minutes, from 12 minutes to 17 minutes, from 15 minutes to 17 minutes, from 1 minute to 15 minutes, from 2 minutes to 15 minutes, from 5 minutes to 15 minutes, from 7 minutes to 15 minutes, from 10 minutes to 15 minutes, from 12 minutes to 15 minutes, from 1 minute to 12 minutes, from 2 minutes to 12 minutes, from 5 minutes to 12 minutes, from 7 minutes to 12 minutes, from 10 minutes to 12 minutes, from 1 minute to 10 minutes, from 2 minutes to 10 minutes, from 5 minutes to 10 minutes, from 7 minutes to 10 minutes, from 1 minute to 7 minutes, from 2 minutes to 7 minutes, from 5 minutes to 7 minutes, from 1 minute to 5 minutes, from 2 minutes to 5 minutes, or from 1 minute to 2 minutes.

The reaction mechanism for curing the epoxy resin may, according to one or more embodiments, be as follows:

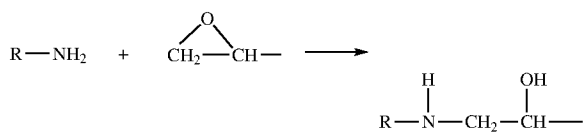

Accordingly, the outer resin layer 130 of the coated proppant 100 comprises a cured resin, which is formed from a reaction between the curing agent and the epoxy resin, and graphene.

Properties of proppant particles with coatings as previously disclosed and described will now be described. Four test methods for determining the properties of proppant particles with coatings as previously disclosed and described were used; Crush Test, Nanoindentation, Thermal Analysis, and Optical Tests. Each of these methods and the properties of proppant particles with coatings as previously disclosed and described are subsequently disclosed.

The Crush Test utilizes a hydraulic load frame with stress levels up to 103 MPa (15000 psi) to test the crush resistance of the proppant particles with coatings as previously disclosed and described. Confined compression tests on the proppants are carried out following the American Petroleum Institute (API RP 60) standard. The size of the proppant particles is 40/70 mesh. The proppant sample was firstly sieved using a 40-mesh sieve so that all tested proppant particles are within the specified size range of 40 mesh. Then, the proppant samples were applied specific stress ranging from 3000 psi to 10000 psi for a period of 2 min. The crushed (damaged) proppant at each stress level is then sieved using the same sieve (40 mesh) to collect the remains and fine (size less than 40 mesh). The fine production (%) was calculated (equation e) from the damaged proppants of size less than 40 mesh.

$$\text{Fine production }(\%) = \frac{\text{Amount of Fine (g)}}{\text{Original weight of Proppant (g)}} \times 100 \quad \text{Equation (2)}$$

Generally, having a fine production of 10% or less is acceptable. However, as the load on the proppant increases, such as the further into the subsurface formation the proppant traverses, the fine production also increases. However, proppant particles with coatings as previously disclosed and described are able to withstand increased loads, as evidenced by decreased fine production even at greater loads. According to embodiments, at a load of 12000 psi, the coated proppant particle has a fine production from 2.0% to 10.0%, from 2.5% to 10.0%, from 3.0% to 10.0%, from 3.5% to 10.0%, from 4.0% to 10.0%, from 4.5% to 10.0%, from 5.0% to 10.0%, from 5.5% to 10.0%, from 6.0% to 10.0%, from 6.5% to 10.0%, from 7.0% to 10.0%, from 7.5% to 10.0%, from 8.0% to 10.0%, from 8.5% to 10.0%, from 9.0% to 10.0%, from 9.5% to 10.0%, from 2.0% to 9.5%, from 2.5% to 9.5%, from 3.0% to 9.5%, from 3.5% to 9.5%, from 4.0% to 9.5%, from 4.5% to 9.5%, from 5.0% to 9.5%, from 5.5% to 9.5%, from 6.0% to 9.5%, from 6.5% to 9.5%, from 7.0% to 9.5%, from 7.5% to 9.5%, from 8.0% to 9.5%, from 8.5% to 9.5%, from 9.0% to 9.5%, from 2.0% to 9.0%, from 2.5% to 9.0%, from 3.0% to 9.0%, from 3.5% to 9.0%, from 4.0% to 9.0%, from 4.5% to 9.0%, from 5.0% to 9.0%, from 5.5% to 9.0%, from 6.0% to 9.0%, from 6.5% to 9.0%, from 7.0% to 9.0%, from 7.5% to 9.0%, from 8.0% to 9.0%, from 8.5% to 9.0%, from 2.0% to 8.5%, from 2.5% to 8.5%, from 3.0% to 8.5%, from 3.5% to 8.5%, from 4.0% to 8.5%, from 4.5% to 8.5%, from 5.0% to 8.5%, from 5.5% to 8.5%, from 6.0% to 8.5%, from 6.5% to 8.5%, from 7.0% to 8.5%, from 7.5% to 8.5%, from 8.0% to 8.5%, from 2.0% to 8.0%, from 2.5% to 8.0%, from 3.0% to 8.0%, from 3.5% to 8.0%, from 4.0% to 8.0%, from 4.5% to 8.0%, from 5.0% to 8.0%, from 5.5% to 8.0%, from 6.0% to 8.0%, from 6.5% to 8.0%, from 7.0% to 8.0%, from 7.5% to 8.0%, from 2.0% to 7.5%, from 2.5% to 7.5%, from 3.0% to 7.5%, from 3.5% to 7.5%, from 4.0% to 7.5%, from 4.5% to 7.5%, from 5.0% to 7.5%, from 5.5% to 7.5%, from 6.0% to 7.5%, from 6.5% to 7.5%, from 7.0% to 7.5%, from 2.0% to 7.0%, from 2.5% to 7.0%, from 3.0% to 7.0%, from 3.5% to 7.0%, from 4.0% to 7.0%, from 4.5% to 7.0%, from 5.0% to 7.0%, from 5.5% to 7.0%, from 6.0% to 7.0%, from 6.5% to 7.0%, from 2.0% to 6.5%, from 2.5% to 6.5%, from 3.0% to 6.5%, from 3.5% to 6.5%, from 4.0% to 6.5%, from 4.5% to 6.5%, from 5.0% to 6.5%, from 5.5% to 6.5%, from 6.0% to 6.5%, from 2.0% to 6.0%, from 2.5% to 6.0%, from 3.0% to 6.0%, from 3.5% to 6.0%, from 4.0% to 6.0%, from 4.5% to 6.0%, from 5.0% to 6.0%, from 5.5% to 6.0%, from 2.0% to 5.5%, from 2.5% to 5.5%, from 3.0% to 5.5%, from 3.5% to 5.5%, from 4.0% to 5.5%, from 4.5% to 5.5%, from 5.0% to 5.5%, from 2.0% to 5.0%, from 2.5% to 5.0%, from 3.0% to 5.0%, from 3.5% to 5.0%, from 4.0% to 5.0%, from 4.5% to 5.0%, from 2.0% to 4.5%, from 2.5% to 4.5%, from 3.0% to 4.5%, from 3.5% to 4.5%, from 4.0% to 4.5%, from 2.0% to 4.0%, from 2.5% to 4.0%, from 3.0% to 4.0%, from 3.5% to 4.0%, from 2.0% to 3.5%, from 2.5% to 3.5%, from 3.0% to 3.5%, from 2.0% to 3.0%, from 2.5% to 3.0%, or from 2.0% to 2.5%.

According to embodiments, at a load of 10000 psi, the coated proppant particle has a fine production from 0.5% to 5.0%, such as from 1.0% to 5.0%, from 1.5% to 5.0%, from 2.0% to 5.0%, from 2.5% to 5.0%, from 3.0% to 5.0%, from 3.5% to 5.0%, from 4.0% to 5.0%, from 4.5% to 5.0%, from 0.5% to 4.5%, from 1.0% to 4.5%, from 1.5% to 4.5%, from 2.0% to 4.5%, from 2.5% to 4.5%, from 3.0% to 4.5%, from 3.5% to 4.5%, from 4.0% to 4.5%, from 0.5% to 4.0%, from 1.0% to 4.0%, from 1.5% to 4.0%, from 2.0% to 4.0%, from 2.5% to 4.0%, from 3.0% to 4.0%, from 3.5% to 4.0%, from 0.5% to 3.5%, from 1.0% to 3.5%, from 1.5% to 3.5%, from 2.0% to 3.5%, from 2.5% to 3.5%, from 3.0% to 3.5%, from 0.5% to 3.0%, from 1.0% to 3.0%, from 1.5% to 3.0%, from 2.0% to 3.0%, from 2.5% to 3.0%, from 0.5% to 2.5%, from 1.0% to 2.5%, from 1.5% to 2.5%, from 2.0% to 2.5%, from 0.5% to 2.0%, from 1.0% to 2.0%, from 1.5% to 2.0%, from 0.5% to 1.5%, from 1.0% to 1.5%, or from 0.5% to 1.0%.

According to embodiments, at a load of 8000 psi, the coated proppant particle has a fine production from 0.5% to 2.0%, such as from 1.0% to 2.0%, from 1.5% to 2.0%, from 0.5% to 1.5%, from 1.0% to 1.5%, or from 0.5% to 1.0%.

The low fine production for coated proppant particles as previously disclosed and described may be related to the increase in hardness and elastic modulus provided by using the cross-linking agent. Without being bound by any particular theory, it is believe that when the cross-linking agent concentration in the co-polymer matrix is increased, the hardness and elastic moduli are also increased, as will be discussed subsequently in more detail. Therefore, the enhancements in the nanomechanical characteristics may be due to the formation of 3D-crosslinked porous networks. In addition, the cross-linking agent crosslinking with the copolymer matrix may further enhance the thermal properties like glass transition temperatures (Tg) and degradation temperatures (Tdeg). It has been found that the addition of cross-linking agent increased the Tg of the copolymer. This shows that the newly formed 3D-crosslinked terpolymer network through cross-linking agent linkages, was able to hinder the chain mobility of the terpolymer matrix, thus requiring higher temperature in order for the polymer chain to move freely. Consequently, increasing the concentration of the cross-linking agent resulted in the subsequent increase of the Tg. This may be credited to the increased crosslinking density of the terpolymer matrix that was induced by the presence of the cross-linking agent. In addition, further increase in cross-linking agent concentration can lead to change in the overall chemical composition of the polymer, such as the cross-linking agent being incorporated into the copolymer backbone and creating a terpolymer, thus increasing the Tg.

Nanoindentation measurements (hardness and elastic modulus) are performed using a calibrated NanoTestTM system (manufactured by Micro Materials, UK) with a standard diamond Berkovich indenter. For each indentation cycle, the loading and unloading lasts 10 seconds (s), respectively, and the dwell time at each peak load is 5 s. Five measurements are performed on each specimen at the 0.1 mN (or 100 μN) load. The force-displacement (P-h profile) data is used to evaluate the hardness (H) and the reduced elastic modulus (Er). The elastic modulus (Ei) and Poisson ratio (vi) of the diamond indenter was taken as 1140 GPa and 0.07, whereas the Poisson ratio (vs) of the specimen was taken as 0.33 (considering the vs as 0.33 for PMMA for the calculations of the elastic modulus (Es). In preparation for the nanoindentation test, the polymer samples are mounted onto the substrate base (steel disc) using cyanoacrylate adhesive (superglue). Nanoindentation tests on all specimens are conducted in air at room temperature (23° C.) in a temperature-controlled environment.

The elastic modulus (E) of coated proppant particles as previously disclosed and described as measured by Nanoindentation is, according to one or more embodiments, from 4.0 GPa to 7.0 GPa, such as from 4.5 GPa to 7.0 GPa, from 5.0 GPa to 7.0 GPa, from 5.5 GPa to 7.0 GPa, from 6.0 GPa to 7.0 GPa, from 6.5 GPa to 7.0 GPa, from 4.0 GPa to 6.5 GPa, from 4.5 GPa to 6.5 GPa, from 5.0 GPa to 6.5 GPa, from 5.5 GPa to 6.5 GPa, from 6.0 GPa to 6.5 GPa, from 4.0 GPa to 6.0 GPa, from 4.5 GPa to 6.0 GPa, from 5.0 GPa to 6.0 GPa, from 5.5 GPa to 6.0 GPa, from 4.0 GPa to 5.5 GPa, from 4.5 GPa to 5.5 GPa, from 5.0 GPa to 5.5 GPa, from 4.0 GPa to 5.0 GPa, from 4.5 GPa to 5.0 GPa, or from 4.0 GPa to 4.5 GPa.

The hardness (H) of coated proppant particles as previously disclosed and described as measured by Nanoindentation is, according to one or more embodiments, from 0.10 GPa to 0.40 GPa, such as from 0.15 GPa to 0.40 GPa, from 0.20 GPa to 0.40 GPa, from 0.25 GPa to 0.40 GPa, from 0.30 GPa to 0.40 GPa, from 0.35 GPa to 0.40 GPa, from 0.10 GPa to 0.35 GPa, from 0.15 GPa to 0.35 GPa, from 0.20 GPa to 0.35 GPa, from 0.25 GPa to 0.35 GPa, from 0.30 GPa to 0.35 GPa, from 0.10 GPa to 0.30 GPa, from 0.15 GPa to 0.30 GPa, from 0.20 GPa to 0.30 GPa, from 0.25 GPa to 0.30 GPa, from 0.10 GPa to 0.25 GPa, from 0.15 GPa to 0.25 GPa, from 0.20 GPa to 0.25 GPa, from 0.10 GPa to 0.20 GPa, from 0.15 GPa to 0.20 GPa, or from 0.10 GPa to 0.15 GPa.

The ratio of hardness to elastic modulus (i.e., H/E) of coated proppant particles as previously disclosed and described as measured by Nanoindentation is, according to one or more embodiments, from 0.040 to 0.050, such as from 0.042 to 0.050, from 0.045 to 0.050, from 0.470 to 0.050, from 0.040 to 0.047, from 0.042 to 0.047, from 0.045 to 0.047, from 0.040 to 0.045, from 0.042 to 0.045, or from 0.040 to 0.042.

The thermal stability of coated proppant particles as previously disclosed and described in respect to the functionalization of the proppant particles with the nanocomposites is studied using thermogravimetric analyses (TGA) Hitachi STA7200 thermal analysis system. TGA of the prepared coated proppant particles are recorded from 30° C. to 500° C. at a heating rate of 2° C./min under nitrogen flow of 50 ml/min. Differential scanning calorimetry (DSC) was performed on a Hitachi DSC7020. The samples were heated from 30° C. to 350° C. at the rate of 5° C./min under nitrogen flow of 50 ml/min.

The degradation temperature (Tdeg) of coated proppant particles as previously disclosed and described as measured by thermal stability is, according to one or more embodiments, from 400° C. to 420° C., such as from 402° C. to 420° C., from 405° C. to 420° C., from 407° C. to 420° C., from 410° C. to 420° C., from 412° C. to 420° C., from 415° C. to 420° C., from 417° C. to 420° C., from 400° C. to 417° C., from 402° C. to 417° C., from 405° C. to 417° C., from 407° C. to 417° C., from 410° C. to 417° C., from 412° C. to 417° C., from 415° C. to 417° C., from 400° C. to 415° C., from 402° C. to 415° C., from 405° C. to 415° C., from 407° C. to 415° C., from 410° C. to 415° C., from 412° C. to 415° C., from 400° C. to 412° C., from 402° C. to 412° C., from 405° C. to 412° C., from 407° C. to 412° C., from 410° C. to 412° C., from 400° C. to 410° C., from 402° C. to 410° C., from 405° C. to 410° C., from 407° C. to 410° C., from 400° C. to 407° C., from 402° C. to 407° C., from 405° C. to 407° C., from 400° C. to 405° C., from 402° C. to 405° C., or from 400° C. to 402° C.

The glass transition temperature (Tg) of coated proppant particles as previously disclosed and described as measured by thermal stability is, according to one or more embodiments, from 80° C. to 90° C., such as from 81° C. to 90° C., from 82° C. to 90° C., from 83° C. to 90° C., from 84° C. to 90° C., from 85° C. to 90° C., from 86° C. to 90° C., from 87° C. to 90° C., from 88° C. to 90° C., from 89° C. to 90° C., from 80° C. to 89° C., from 81° C. to 89° C., from 82° C. to 89° C., from 83° C. to 89° C., from 84° C. to 89° C., from 85° C. to 89° C., from 86° C. to 89° C., from 87° C. to 89° C., from 88° C. to 89° C., from 80° C. to 88° C., from 81° C. to 88° C., from 82° C. to 88° C., from 83° C. to 88° C., from 84° C. to 88° C., from 85° C. to 88° C., from 86° C. to 88° C., from 87° C. to 88° C., from 80° C. to 87° C., from 81° C. to 87° C., from 82° C. to 87° C., from 83° C. to 87° C., from 84° C. to 87° C., from 85° C. to 87° C., from 86° C. to 87° C., from 80° C. to 86° C., from 81° C. to 86°

C., from 82° C. to 86° C., from 83° C. to 86° C., from 84° C. to 86° C., from 85° C. to 86° C., from 80° C. to 85° C., from 81° C. to 85° C., from 82° C. to 85° C., from 83° C. to 85° C., from 84° C. to 85° C., from 80° C. to 84° C., from 81° C. to 84° C., from 82° C. to 84° C., from 83° C. to 84° C., from 80° C. to 83° C., from 81° C. to 83° C., from 82° C. to 83° C., from 80° C. to 82° C., from 81° C. to 82° C., or from 80° C. to 81° C.

The optical microscope (SCO Tech) was used to visualize the coated proppant particle image at the micrometer scale. This is done to compare potential morphological and shape changes among the proppant particles. The samples are viewed at 40× magnification for the objective lens.

The spherecity of coated proppant particles as previously disclosed and described as measured by thermal stability is, according to one or more embodiments, from 0.4 to 1.0, such as from 0.5 to 1.0, from 0.6 to 1.0, from 0.7 to 1.0, from 0.8 to 1.0, from 0.9 to 1.0, from 0.4 to 0.9, from 0.5 to 0.9, from 0.6 to 0.9, from 0.7 to 0.9, from 0.8 to 0.9, from 0.4 to 0.8, from 0.5 to 0.8, from 0.6 to 0.8, from 0.7 to 0.8, from 0.4 to 0.7, from 0.5 to 0.7, from 0.6 to 0.7, from 0.4 to 0.6, from 0.5 to 0.6, or from 0.4 to 0.5. Sphericity measures the degree to which a particle approaches a spherical shape. Sphericity was defined by Wadell, H., Volume, Shape, and Roundness of Rock Particles, Journal of Geology, 1932, 40, 443-45 as the ratio between the diameter of a sphere with the same volume as the particle and the diameter of the circumscribed sphere. As used herein, the sphericity of a particle is determined by measuring the three linear dimensions of the particle (longest (L), intermediate (I) and shortest (S). The roundness of the particle by visual comparison with the roundness chart. The long (L), intermediate (I) and short (S) diameters of particle were measured using calipers. From this, the ratios I/L and S/I can be determine the sphericity (to the nearest 0.1 unit) using the Zingg diagram, such as the diagrams in Zingg, T., Beitrag zur Schotteranalyse: Schweiz. Min. Pet. Mittl, 1935, 15, 39-140, and Aschenbenner, B. C., A New Method of Expressing Sphericity, Journal of Sedimentary Petrology, 1956, 26, 15-31.

EXAMPLES

The following examples illustrate features of the present disclosure but are not intended to limit the scope of the disclosure.

Example 1

A 3D-cross-linked polystyrene-polymethyl methacrylate/divinyl benzene (PS-PMMA/DVB) terpolymer intermediate layer was formed on the surface of sand (i.e., proppant particle) as follows.

Five (5) wt. % of AIBN was dissolved in acetone and added to sand. The mixture of AIBN and sand was treated for 12 hours at 40° C. to modify the surface of the sand. This step ensured the presence of initiator (i.e., AIBN) at the surface of the sand so that the polymerization will be initiated at the surface of the sand once the were added to the sand. The AIBN coated sand is subsequently referred to as surface treated sand. Separate from the surface treated sand, the was prepared by mixing 45 wt. % styrene and 45 wt. % methyl methacrylate. Then 10 wt. % of divinyl benzene (i.e., cross-linking agent) was added to the mixture and sonicated for 15 minutes. Subsequently, 5 wt. % of recrystallized AIBN (i.e., initiator) was added as a super addition to the combination of styrene, methyl methacrylate, and divinyl benzene. The mixture of styrene, methyl methacrylate, and divinyl benzene formed a monomers solution.

The monomers solution was added to the surface treated sand and mixed with a blender. Subsequently, the mixture of surface treated sand and monomers solution was polymerized at 70° C. for 1 to 2 days.

After the polymerization was complete, a curable epoxy resin was prepared by mixing 80 wt. % bisphenol A epoxy resin and 20 wt. % of an aliphatic amine curing agent. To this mixture, 0.1 wt. % of XGnP-M-25 graphene Nanoplatelets manufactured by XG Sciences was added as a super addition.

The curable epoxy resin mixture was added to cross-linked terpolymer coated sand, mixed well with a blender, and cured at a temperature of 150° C. for 5 minutes.

Examples 2 and 3

The previously disclosed process was repeated to make two additional coated proppant materials. However, in Example 2 the amount of the cross-linking agent (DVB) was decreased to 5 wt. %, and in Example 3 the amount of the cross-linking agent (DVB) was decreased to 1 wt. %.

Comparative Example 1

The previously disclosed process was repeated to make a comparative coated proppant material. However, in Comparative Example 1 no cross-linking agent (DVB) was added to the combination of monomers. Accordingly, in the coated proppant of Comparative Example 1, the intermediate layer is a copolymer (i.e., not a terpolymer) of polystyrene and polymethyl methacrylate (PS-PMMA). For the purpose of clarity, the epoxy resin layer of Comparative Example 1 is the same as the epoxy resin layer in Examples 1-3.

Crush Test

To show the properties of the coated proppant according to embodiments previously disclosed and described, a crush test—as previously described—was performed on neat sand (i.e., sand without any coating), the coated proppant of Comparative Example 1, and the coated proppant of Example 1 as follows.

Figure 3:
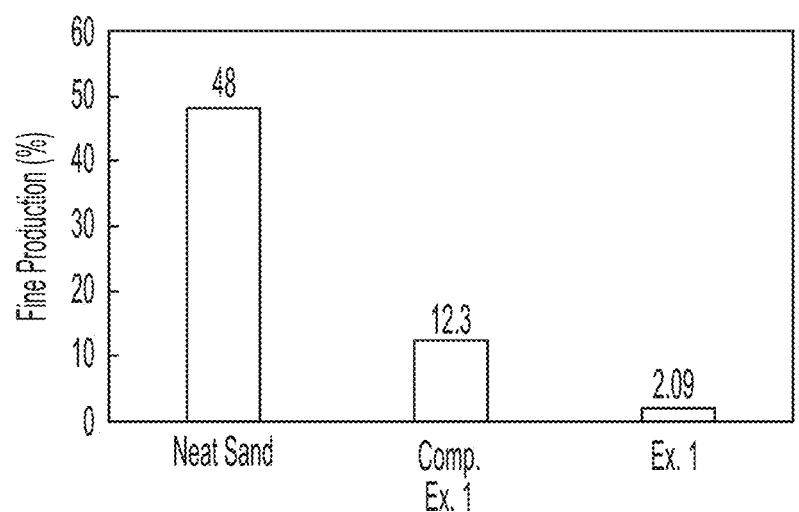
FIG. 3 graphically depicts the fine production of coated proppants according to one or more embodiments described in this disclosure and comparative proppants.

The crush test—as previously described—was performed at a load of 10000 psi. The neat sand produced 48% fine, the coated proppant of Comparative Example 1 produced a fine production of 12.3%, and the coated proppant of Example 1 produced a fine production of 2.09%, as shown in FIG. 3.

Without being bound to any particular theory, it is believed that the decreased fine production for the coated proppant of Example 1 at high stresses of 10000 psi is correlated to cross-linking agent (DVB) in the PS-PMMA polymer matrix of the coated proppant of Example 1 and the 3D-cross-linked terpolymer network structures formed thereby.

Figure 4:
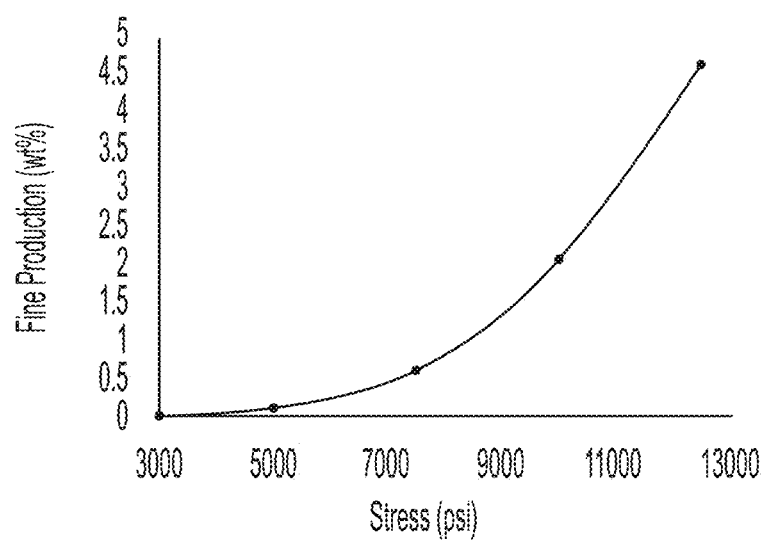
FIG. 4 graphically depicts the fine production of coated proppants according to one or more embodiments described in this disclosure.

A more detailed analysis of the fine production of the coated proppant of Example 1 is provided in FIG. 4 where the crush test was performed at loads from 3000 psi to 12500 psi. As shown in FIG. 4, the fine production increases with an increase in the applied load, and the fine production only reached a value of approximately 5% at an enormous applied stress of 12500 psi. This shows that the coated proppants of Example 1 have increased crush strength and may be beneficial for use in deep subsurface formations. As previously disclosed, any fine production less than 10% at an applied load of 10000 psi indicates that a proppant may be suitable for some uses. The coated proppant of Example 1 significantly exceeds this standard, and shows its usefulness under extremely high pressures.

Nanoindentation Test

The mechanical properties (such as elastic modulus (E) and hardness (H)) were measured on the coated proppants of Comparative Example 1 and Examples 1-3 using the Nanoindentation test as previously described. Table 1 that follows shows the results of those tests.

TABLE 1

|  | Nano-indentation | | |
| --- | --- | --- | --- |
|  | E (GPa) | H (GPa) | H/E |
| Comp. Ex. 1 | 3.82 | 0.130 | 0.034 |
| Ex. 3 | 4.42 | 0.190 | 0.043 |
| Ex. 2 | 5.40 | 0.240 | 0.044 |
| Ex. 1 | 6.27 | 0.298 | 0.048 |

As shown by the above data, the high stress resistance for the coated proppants of Examples 1-3 is further supported by increased hardness and elastic modulus with introduction and increasing of the cross-linking agent (DVB) in PS-PMMA copolymer films. Also, as shown in Table 1, when the cross-linking agent (DVB) concentration in the polymer matrix is increased from 1 wt. % (i.e., Example 3) to 10 wt. % (i.e., Example 1), the hardness and elastic moduli are increased from 0.190 GPa to 0.298 GPa and 4.42 GPa to 6.27 GPa, respectively. Thus, the H/E of the coated proppants of Examples 1-3 also increased from 0.034 to 0.043 as the amount of cross-linking agent in the coated proppant increased. This enhancement in mechanical properties could be attributed to the strong bond created as a result of DVB crosslinking. This is significantly higher than the hardness and elastic modulus of Comparative Example 1, which does not include a cross-linking agent, and has a hardness and elastic modulus of 0.13 GPa and 3.82 GPa, respectively. Therefore, without being bound by any particular theory, the improvements in the nanomechanical characteristics can be due to the formation of 3D- cross-linked terpolymer porous networks that are formed by the inclusion of a cross-linking agent.

Thermal Analysis

Thermal analysis (such as the degradation temperature (Tdeg) and glass transition temperature (Tg)) were measured on the coated proppants of Comparative Example 1 and Examples 1-3 using the thermal analysis as previously disclosed. Table 2 that follows shows the results of those tests.

TABLE 2

|  | DSC $T_g$ (° C.) | TGA $T_{deg}$ (° C.) |
| --- | --- | --- |
| Comp. Ex. 1 | 84.2 | 395 |
| Ex. 3 | 86.7 | 403 |
| Ex. 2 | 87.2 | 406 |
| Ex. 1 | 88.0 | 411 |

Figure 5:
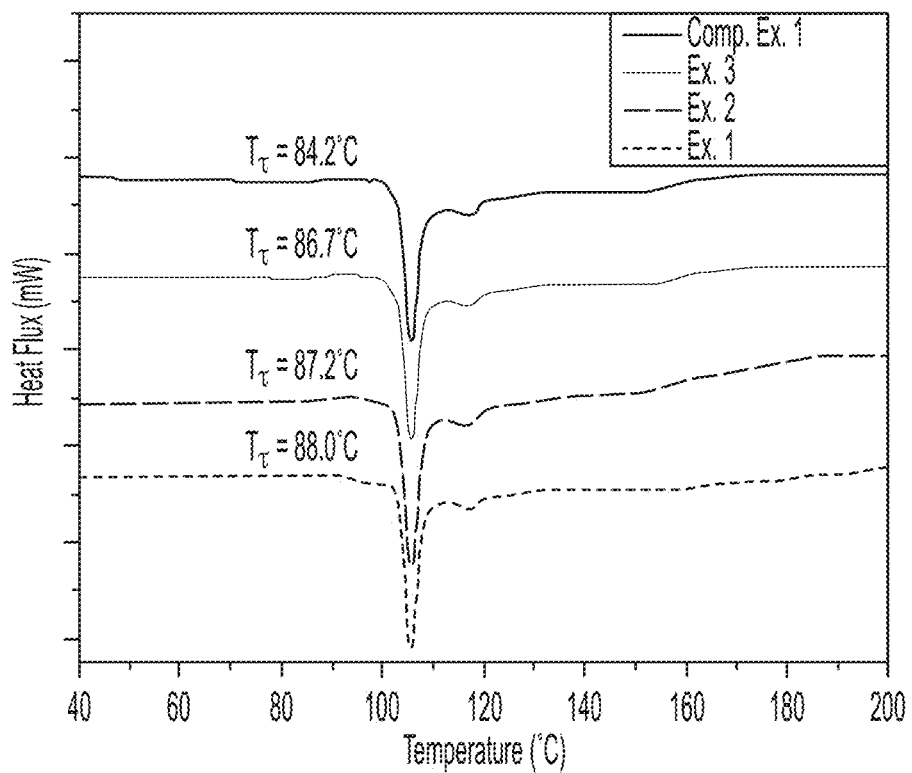
FIG. 5 graphically depicts the glass transition temperatures of coated proppants according to one or more embodiments described in this disclosure and comparative proppants.

FIG. 5 depicts the differential scanning calorimetry (DSC) thermograms of the 3D-cross-linked PS-PMMA/DVB terpolymer of the coated proppant of Examples 1-3 in comparison to PS-PMMA copolymer of the coated proppant of Comparative Example 1. From these DSC results, it was shown that the glass Tg of the coated proppants of Examples 1-3 were 86.7° C. (Example 3), 87.2° C. (Example 2), and 88.0° C. (Example 1). By comparison, the Tg of the coated proppant of Comparative Example 1 was recorded at 84.2° C.

From this data, it is evident that addition of the cross-linking agent (DVB) increased the glass transition temperature of the polymer. Without being bound by any particular theory, it is believed that this shows that the 3D-cross-linked PS-PMMA/DVB network of the coated proppant of Examples 1-3 was able to hinder the chain mobility of the PS-PMMA/DVB matrix, thus requiring higher temperature in order for the polymer chain to move freely. Consequently, increasing the concentration of the cross-linking agent (DVB), resulted in the subsequent increase of the Tg of the coated proppant. It is believed that this is due to the increased crosslinking density of the PS-PMMA/DVB matrix that was induced by the presence of the cross-linking agent (DVB). Also, as shown by a comparison of Examples 1-3, it was shown that an increase in cross-linking agent (DVB) concentration can lead to change in the overall chemical composition of the polymer. Without being bound by any particular theory, it is believed that the cross-linking agent (DVB) was incorporated into the PS-PMMA/DVB backbone and created a cross-linked terpolymer that increased the Tg of the coated proppant.

Figure 6:
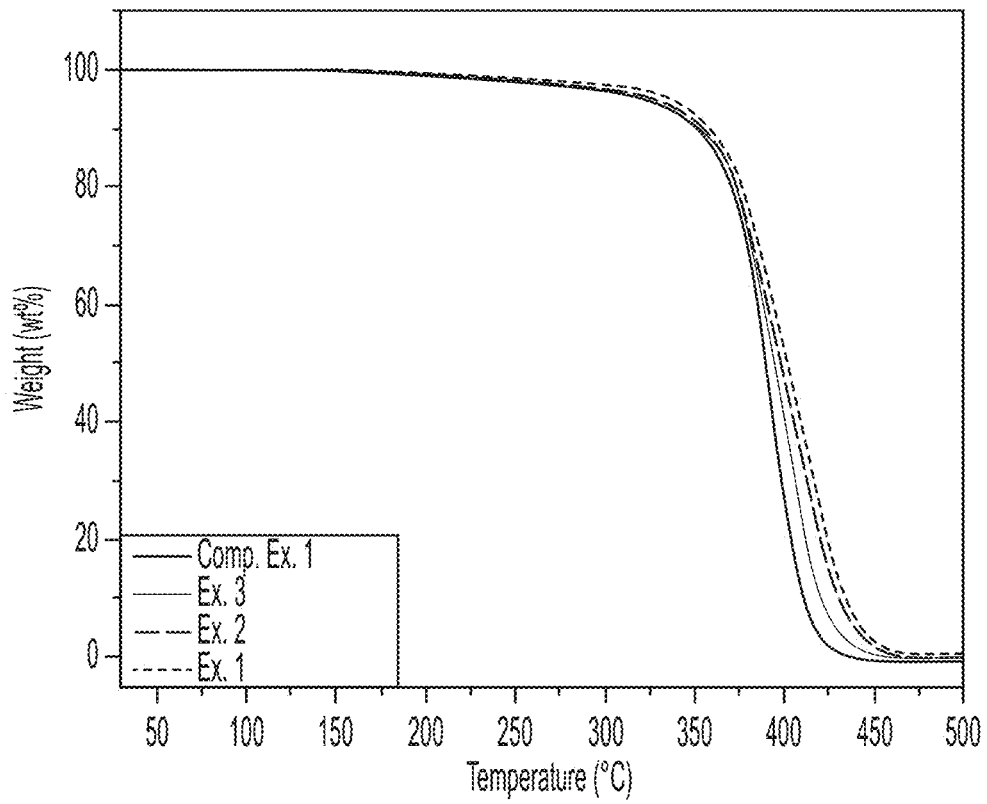
FIG. 6 graphically depicts the degradation temperatures of coated proppants according to one or more embodiments described in this disclosure and comparative proppants.

In addition, the thermal stability of the coated proppant of Examples 1-3 in comparison to the coated proppant of Comparative Example 1 was studied using thermal gravimetric analysis (TGA) and the results are shown in FIG. 6. From this figure, it was observed that all the synthesised polymers in the coated proppants undergo one-step degradation. The maximum weight loss was seen to take place around 395° C. due to the decomposition for the PS-PMMA backbone. However, this temperature shifted to higher value upon addition of a cross-linking agent (DVB). This reflects the effect of a cross-linking agent in the PS-PMMA matrix, enhancing its thermal stability. The Tdeg of the coated proppant of Examples 1-3 was increased with increase in DVB concentration.

Optical Test

Figure 7A:
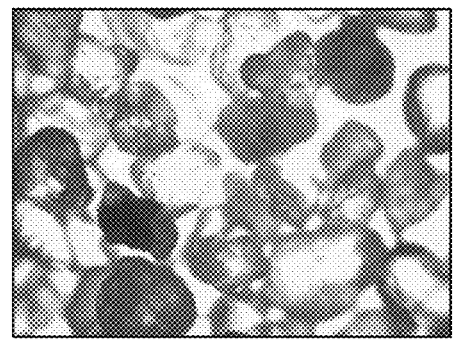
FIGS. 7A-7C are magnified images of coated proppants according to one or more embodiments described in this disclosure and comparative proppants.
Figure 7B:
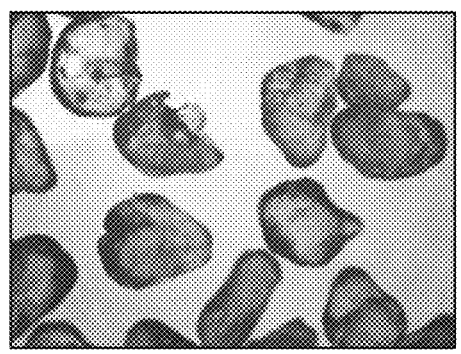
Figure 7C:
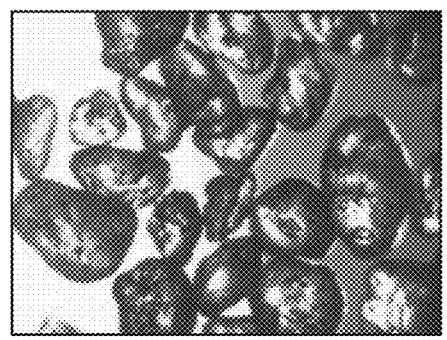

FIGS. 7A-7C show the optical images of neat sand (FIG. 7A), coated proppants of Comparative Example 1 (FIG. 7B), and the coated proppant of Example 1 for analysis of roundness and sphericity. From these figures, it is evident that the coated proppant of Example 1 was observed to have the best sphericity, such as roundness and sphericity of 0.6 or higher. As previously described, the optical microscope (SCO Tech) was used to visualize the coated proppants at the micrometer scale. This was done to compare potential morphological and shape changes among the sand particles. The samples were viewed at 40× magnification for the objective lens.

Figure 8A:
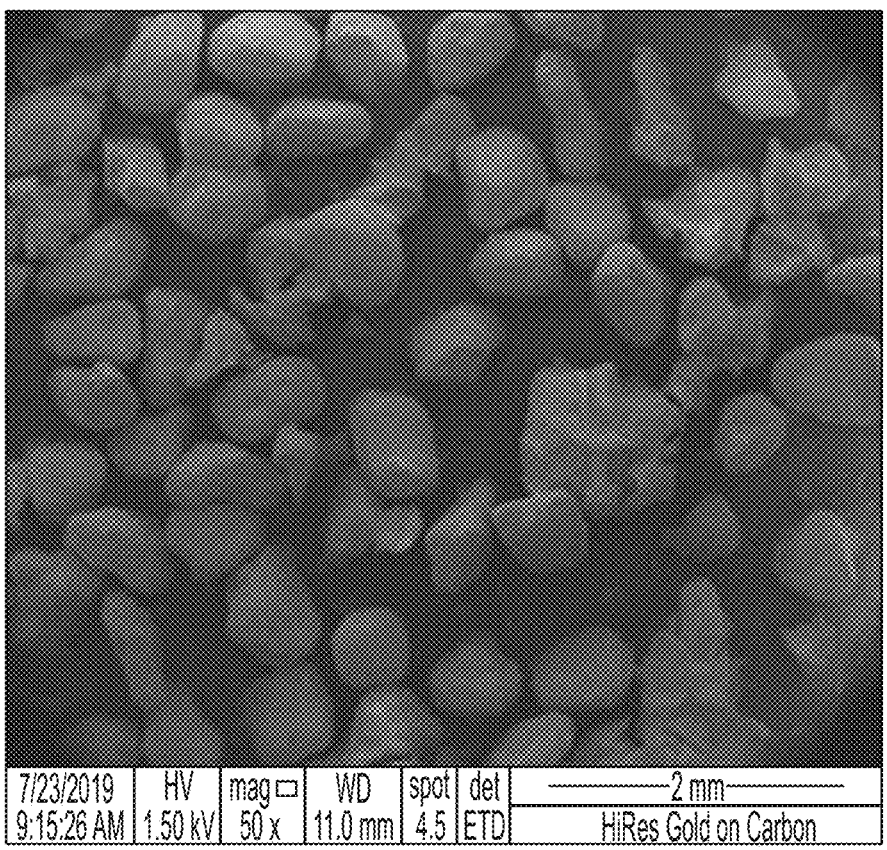
FIGS. 8A-8B are SEM images of coated proppants according to one or more embodiments described in this disclosure and comparative proppants.
Figure 8B:
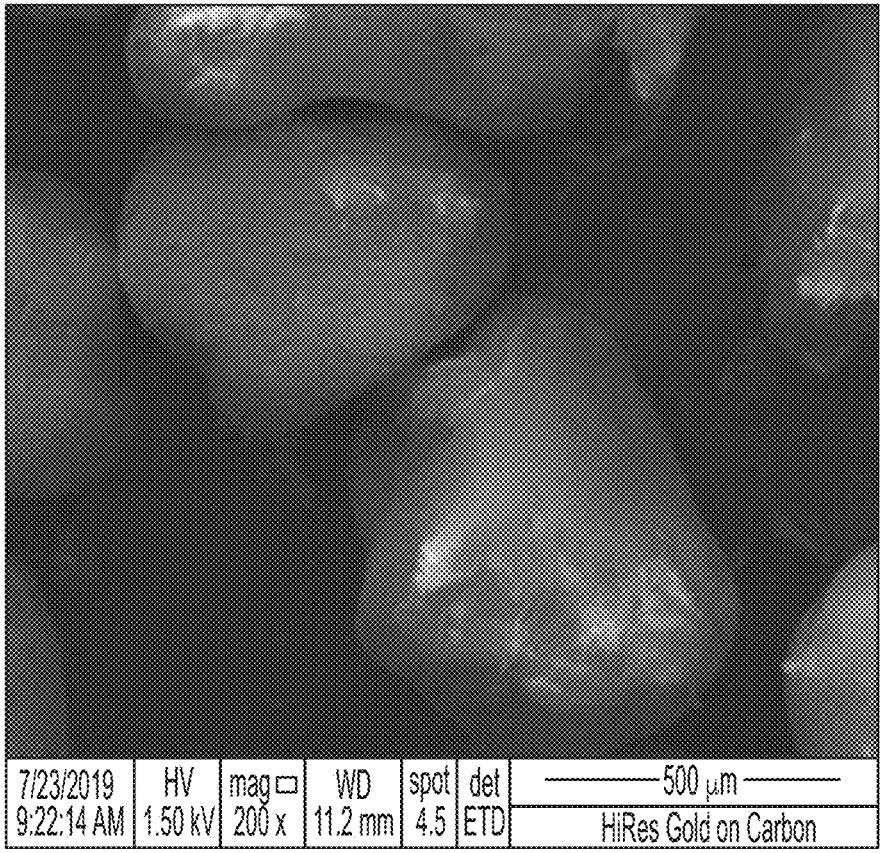

FIGS. 8A-8C show SEM images of the coated proppant of Example 1 at different magnifications to measure for roundness and sphericity. FIG. 8A shows the coated proppants of Example 1 at 50× magnification, FIG. 8B shows the coated proppants of Example 1 at 200× magnification, and FIG. 8C shows the coated proppants of Example 1 at 500× magnification. It is evident that the proppants related to current invention had excellent roundness and sphericity.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modifications and variations come within the scope of the appended claims and their equivalents.

Having described the subject matter of the present disclosure in detail and by reference to specific embodiments thereof, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A coated proppant comprising:
    a proppant particle;
    an intermediate cross-linked terpolymer layer encapsulating the proppant particle, wherein the intermediate cross-linked terpolymer layer comprises
        a copolymer of a first monomer comprising a cis- or trans-ethylene substituted aromatic organic compound and a second monomer comprising an alkyl acrylate, and
        a cross-linking agent incorporated into the copolymer backbone to form the terpolymer; and
    an outer resin layer encapsulating the intermediate cross-linked terpolymer layer, wherein the outer resin layer comprises a cured epoxy resin and graphene.

2. The coated proppant of claim 1, wherein the proppant particle is selected from the group consisting of oxides, silicates, sand, ceramic, resin, epoxy, plastic, mineral, glass, and combinations thereof.

3. The coated proppant of claim 1, wherein the proppant particle is selected from the group consisting of sand, ceramic, glass, and combinations thereof.

4. The coated proppant of claim 1, wherein the first monomer is styrene.

5. The coated proppant of claim 1, wherein the second monomer is methyl methacrylate.

6. The coated proppant of claim 1, wherein the first monomer is styrene and the second monomer is methyl methacrylate.

7. The coated proppant of claim 1, wherein the first monomer is present in the copolymer in an amount from 10.0 wt. % to 90.0 wt. %, and the second monomer is present in the copolymer in an amount from 10.0 wt. % to 90.0 wt. %.

8. The coated proppant of claim 7, wherein the first monomer is present in the copolymer in an amount from 40.0 wt. % to 60.0 wt. %, and the second monomer is present in the copolymer in an amount from 40.0 wt. % to 60.0 wt. %.

9. The coated proppant of claim 1, wherein the cross-linking agent is selected from the group consisting of divinyl benzene, vinylpyridine, bis(vinylphenyl) ethane, bis(vinylbenzyloxy) hexane, and combinations thereof.

10. The coated proppant of claim 9, wherein the cross-linking agent comprises divinyl benzene.

11. The coated proppant of claim 1, wherein the cross-linking agent is present as a super addition relative to the copolymer in an amount from 0.5 wt. % to 30.0 wt. % by weight of the copolymer.

12. The coated proppant of claim 1, wherein the cross-linking agent is present as a super addition relative to the copolymer in an amount from 1.0 wt. % to 15.0 wt. % by weight of the copolymer.

13. The coated proppant of claim 1, wherein the cured epoxy resin is formed from an epoxy resin and a curing agent.

14. The coated proppant of claim 13, wherein the epoxy resin has the following general formula:

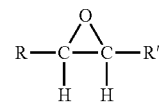

wherein R and R' are selected from the group consisting of a six-membered ring, a polyhydroxyphenol, a polybasic acid, a polyol, and combinations thereof.

15. The coated proppant of claim 13, wherein the curing agent is selected from the group consisting of aliphatic polyamines and their derivatives, modified aliphatic amines, aromatic amines, and combinations thereof.

16. The coated proppant of claim 1, wherein the coated proppant produces fine production at a load of 12000 psi that is from 2.0% to 10.0%.

17. The coated proppant of claim 1, wherein the coated proppant produces fine production at a load of 10000 psi that is from 0.5% to 5.0%.

18. The coated proppant of claim 1, wherein the coated proppant has an elastic modulus from 4.0 GPa to 7.0 GPa.

19. The coated proppant of claim 1, wherein the coated proppant has a hardness from 0.10 GPa to 0.40 GPa.

20. The coated proppant of claim 1, wherein
    the proppant particle is selected from the group consisting of sand, ceramic, glass, and combinations thereof;
    the intermediate cross-linked terpolymer layer comprises styrene as the first monomer, methyl methacrylate as the second monomer, and divinyl benzene as the cross-linking agent; and
    the outer resin layer comprises a cured epoxy resin formed from an epoxy resin and a curing agent, wherein
    the epoxy resin has the following general formula:

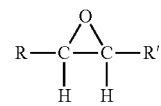

wherein R and R' are selected from the group consisting of a part of a six-membered ring, a polyhydroxyphenol, a polybasic acid, a polyol, and combinations thereof, and
    the curing agent is selected from the group consisting of aliphatic polyamines and their derivatives, modified aliphatic amines, aromatic amines, and combinations thereof.

* * * * *